(12) United States Patent
Eckman et al.

(10) Patent No.: US 12,421,045 B2
(45) Date of Patent: *Sep. 23, 2025

(54) CONTROLLING AUTOMATED PALLET MOVERS

(71) Applicant: Lineage Logistics, LLC, Irvine, CA (US)

(72) Inventors: Christopher Frank Eckman, San Francisco, CA (US); Daniël Walet, Bergen op Zoom (NL); Frank Baijens, Bergen op Zoom (NL)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,960

(22) Filed: Apr. 30, 2024

(65) Prior Publication Data

US 2024/0351789 A1 Oct. 24, 2024

Related U.S. Application Data

(63) Continuation of application No. 18/341,438, filed on Jun. 26, 2023, now Pat. No. 11,999,571, which is a continuation of application No. 17/169,973, filed on Feb. 8, 2021, now Pat. No. 11,724,882, which is a
(Continued)

(51) Int. Cl.
*B65G 1/137* (2006.01)
*G01C 21/20* (2006.01)
(Continued)

(52) U.S. Cl.
CPC ......... *B65G 1/1375* (2013.01); *G01C 21/206* (2013.01); *G05B 13/0265* (2013.01);
(Continued)

(58) Field of Classification Search
CPC .................................................. B65G 1/1375
See application file for complete search history.

(56) References Cited

U.S. PATENT DOCUMENTS 10,242,273 B1 3/2019 Eckman
2004/0144843 A1\* 7/2004 Fabre ................... B65G 1/1376
235/383

(Continued)

OTHER PUBLICATIONS

Extended Search Report in EP Application No. 20788441.2, dated Jun. 2, 2023, 10 pages.
(Continued)

*Primary Examiner* — Kyle O Logan
(74) *Attorney, Agent, or Firm* — Barnes & Thornburg LLP

(57) ABSTRACT

An automated warehouse system can include automated pallet movers, a physical space in which the automated pallet movers operate, and a control system to provide commands to each of the automated pallet movers for operating in the physical space. The commands can include a pallet transportation command including a pallet identifier of a pallet to be transported by the automated pallet mover in the physical space, and a destination location to which the pallet is to be transported by the automated pallet mover. The commands can also include a control algorithm command that specifies a control algorithm for moving through the physical space. The automated pallet mover can be configured to transport the pallet to the destination location according to a route resulting from performance of the control algorithm, while other automated pallet movers concurrently transport other pallets to other destination locations.

19 Claims, 19 Drawing Sheets

Related U.S. Application Data continuation of application No. 16/843,845, filed on Apr. 8, 2020, now Pat. No. 10,913,606.

(60) Provisional application No. 62/880,640, filed on Jul. 30, 2019, provisional application No. 62/880,638, filed on Jul. 30, 2019, provisional application No. 62/831,695, filed on Apr. 9, 2019, provisional application No. 62/830,904, filed on Apr. 8, 2019.

(51) Int. Cl.
| | |
|---|---|
| *G05B 13/02* | (2006.01) |
| *G05D 1/00* | (2006.01) |
| *G05D 1/646* | (2024.01) |
| *G05D 1/692* | (2024.01) |
| *G06Q 10/08* | (2023.01) |

(52) U.S. Cl.
CPC ......... *G05D 1/0212* (2013.01); *G05D 1/0287* (2013.01); *G05D 1/646* (2024.01); *G05D 1/692* (2024.01); *G06Q 10/08* (2013.01)

(56) References Cited

U.S. PATENT DOCUMENTS

| | | | |
|---|---|---|---|
| 2008/0106468 A1* | 5/2008 | Litva | G01V 15/00 |
| | | | 342/451 |
| 2008/0131255 A1 | 6/2008 | Hessler et al. | |
| 2013/0096735 A1* | 4/2013 | Byford | G05D 1/0234 |
| | | | 701/28 |
| 2014/0058612 A1* | 2/2014 | Wong | G06F 17/00 |
| | | | 701/25 |
| 2014/0277691 A1* | 9/2014 | Jacobus | B66F 9/24 |
| | | | 700/216 |
| 2015/0347840 A1* | 12/2015 | Iida | G06T 7/73 |
| | | | 382/103 |
| 2016/0090283 A1* | 3/2016 | Svensson | B66F 9/14 |
| | | | 701/50 |
| 2016/0090284 A1* | 3/2016 | Svensson | B66F 9/07 |
| | | | 701/50 |
| 2016/0176638 A1* | 6/2016 | Toebes | G05D 1/0282 |
| | | | 701/25 |
| 2018/0029797 A1* | 2/2018 | Hance | B65G 1/0492 |
| 2018/0300435 A1* | 10/2018 | Eckman | G06Q 10/08 |
| 2020/0317449 A1 | 10/2020 | Eckman | |
| 2021/0253352 A1* | 8/2021 | Eckman | B65G 1/0485 |

OTHER PUBLICATIONS

International Preliminary Report on Patentability in International Appln. No. PCT/US2020/027338, dated Oct. 21, 2021, 7 pages.

PCT International Search Report and Written Opinion in International Application No. PCT/US20/27338, dated Jul. 8, 2020, 9 pages.

\* cited by examiner

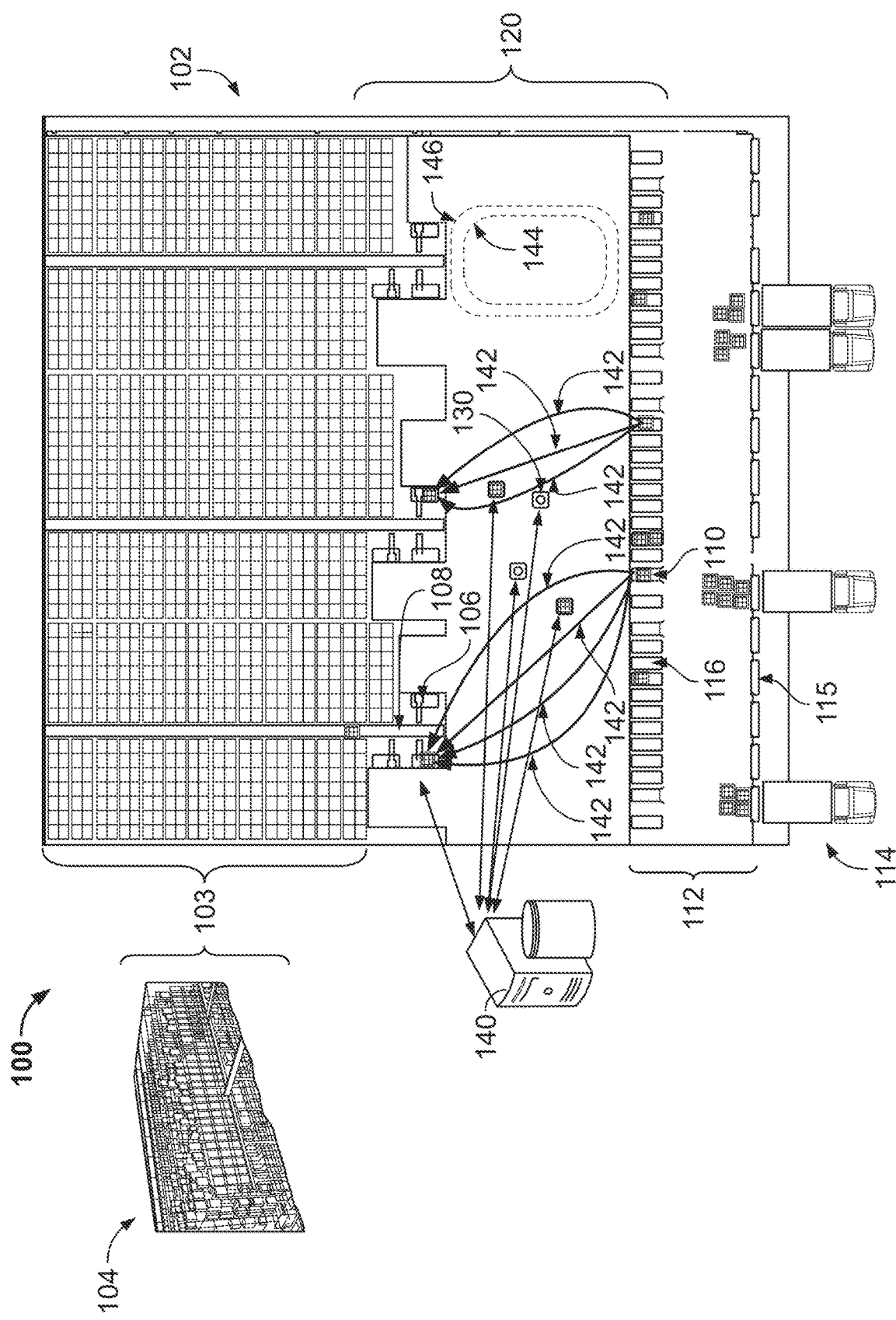

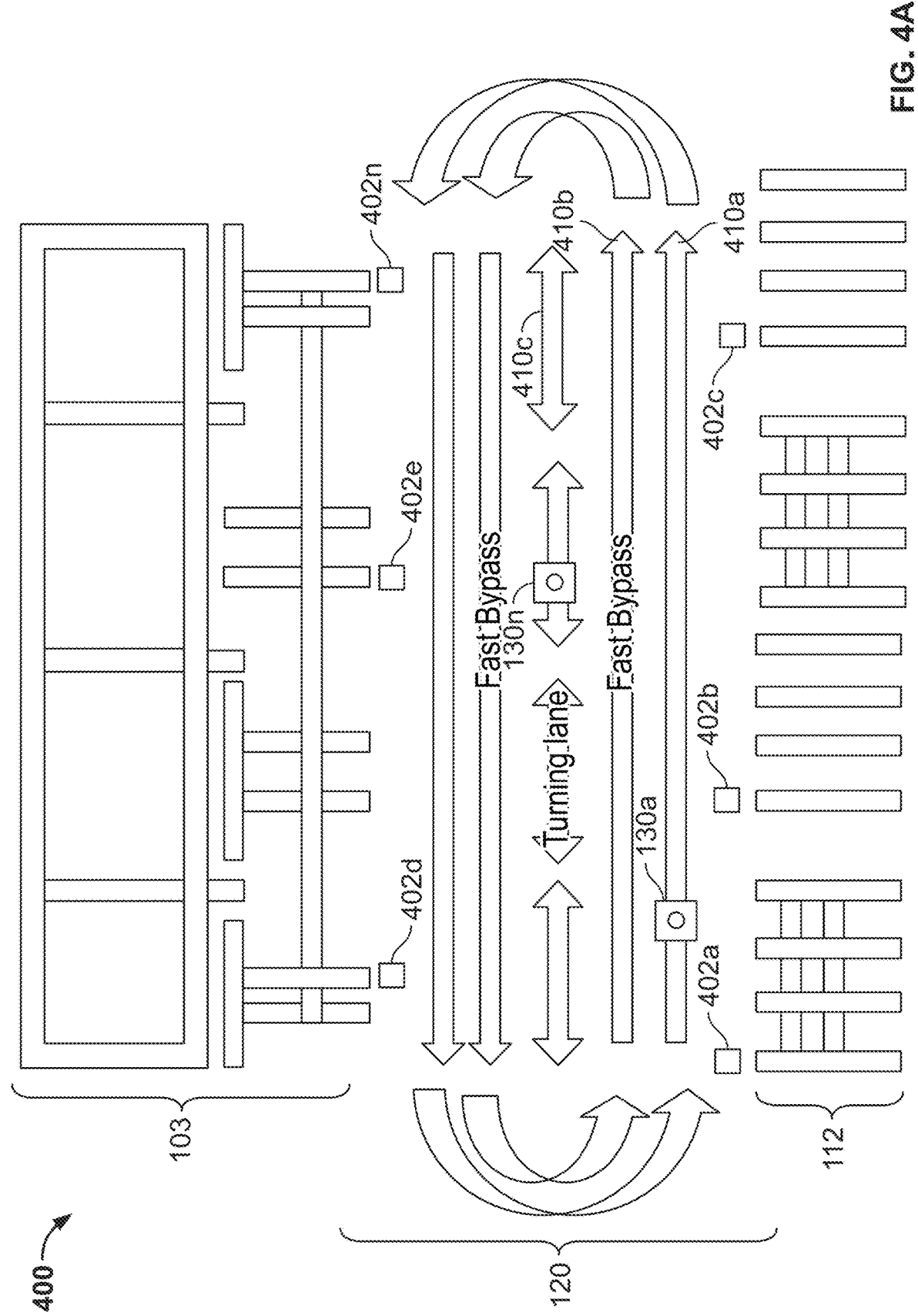

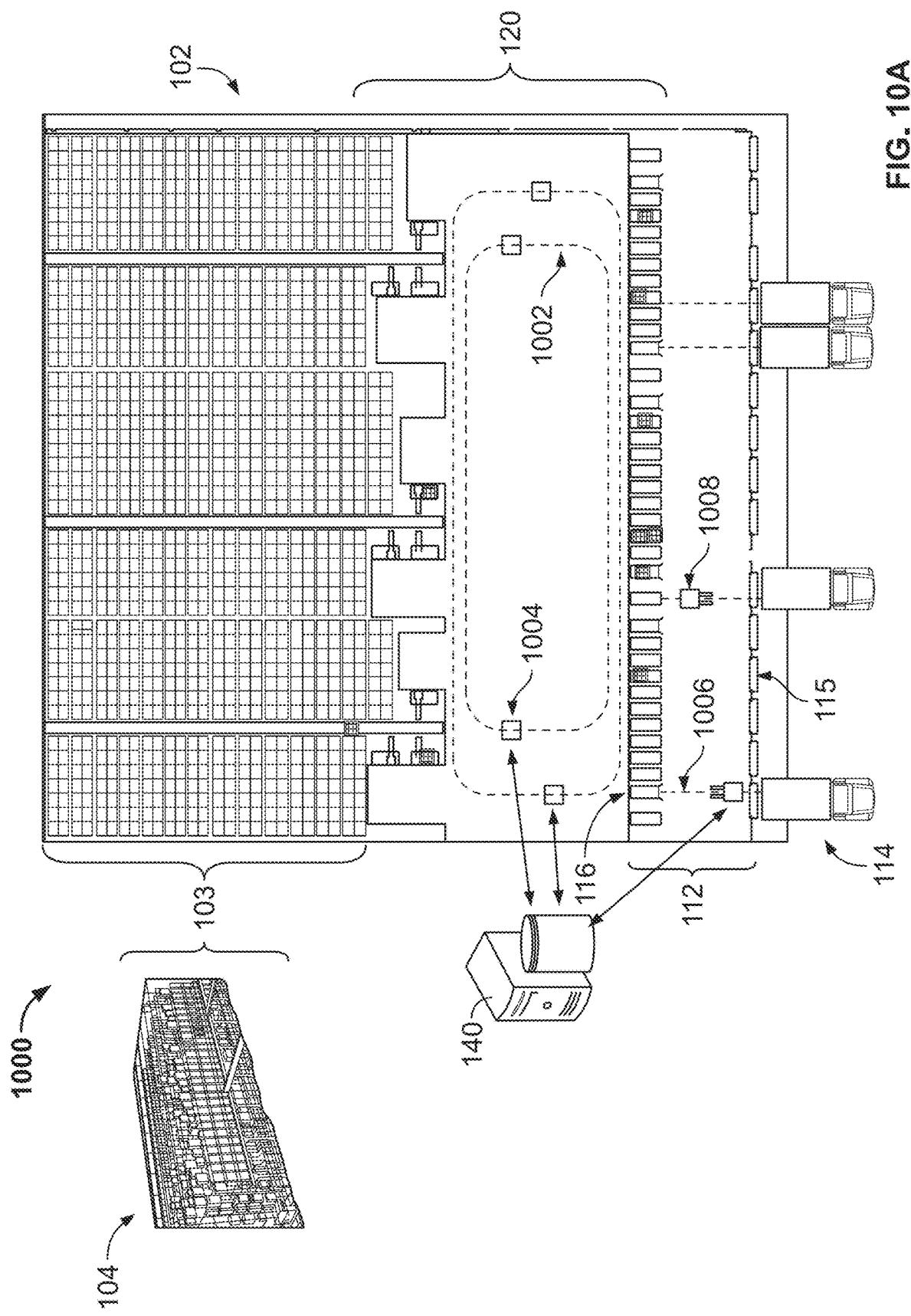

CONTROLLING AUTOMATED PALLET MOVERS

CROSS-REFERENCE TO RELATED APPLICATIONS

This application is a continuation of U.S. patent application Ser. No. 18/341,438, filed Jun. 26, 2023, which is a continuation application of U.S. patent application Ser. No. 17/169,973, filed Feb. 8, 2021 and issued Aug. 15, 2023 as U.S. Pat. No. 11,724,882, which is a continuation application of U.S. patent application Ser. No. 16/843,845, filed Apr. 8, 2020 and issued on Feb. 9, 2021 as U.S. Pat. No. 10,913,606, which claims priority to U.S. Provisional Patent Application No. 62/830,904, filed Apr. 8, 2019; to U.S. Provisional Patent Application No. 62/831,695, filed on Apr. 9, 2019; to U.S. Provisional Patent Application No. 62/880,638, filed Jul. 30, 2019; and to U.S. Provisional Patent Application No. 62/880,640, filed Jul. 30, 2019, the entire contents of each of which are incorporated herein by reference.

TECHNICAL FIELD

This document generally describes technology for controlling operations of multiple automated pallet movers in a physical space.

BACKGROUND

In general, automated warehouse systems can automate storage and retrieval of goods and pallets in a warehouse. Pallets, for example, can be flat transport structures that support goods in a stable manner and that are adapted to fit forklifts and/or other devices/machines to move the pallets. Automated warehouse systems can include conveyors designed for transporting goods and pallets to specific warehouse locations, and racking systems for storing and retrieving the goods and pallets.

SUMMARY

This document generally describes computer systems, processes, program products, and devices for controlling operations of multiple automated pallet movers in a physical space, such as a warehouse. Some embodiments described herein include controlling operations of the multiple automated pallet movers in an area between a pallet loading/unloading area and a pallet storage area in the warehouse. A warehouse may include a pallet loading/unloading area where trucks are docked so that pallets can be unloaded from, or loaded to, the trucks. A warehouse may further include a pallet storage area configured to store pallets in a dense arrangement. For example, the pallet storage area may include multiple-story racks with an elevator system operable to convey pallets to/from different floors of the racks. Typically, a conveyor belt system may be used to transport pallets between the pallet loading/unloading area and the pallet storage area. A conveyor belt system includes a complex layout of conveyor belts which has many connection points between the conveyor belts and many bottle neck areas where multiple conveyor belts are connected to one conveyor belt. The conveyor belt system operates to concurrently convey multiple pallets from different start locations to different end locations. For example, the pallet loading/unloading area may include multiple decks from which pallets can be loaded to trucks, and to which pallets can be unloaded from trucks by workers. Further, the pallet racks may have multiple columns and rows in multiple levels (heights) to/from which pallets can be transported using different elevators. Such a complex conveyor belt system often results in clogging when a large number of pallets are conveyed at the same time between different start locations and end locations. For example, pallets which travel deep in the conveyor belt system can be stuck with other pallets moving along long routes of conveyor belts. Moreover, once the conveyor belts are set up, they are less flexible in creating and modifying paths along which pallets can be carried.

The pallet transportation system described herein uses automated guided vehicles (AGVs) that replace the complex installed conveyor belt system to move pallets in a warehouse. Automated guided vehicles can automatically navigate through the warehouse and can be capable of picking up, moving, and dropping off pallets at various locations in the warehouse. Algorithms can be configured to optimize operation of automated guided vehicles in the warehouse, and can be used to determine optimal routes of each automated guided vehicle from a start location to an end location. For example, the algorithms can be configured to optimize or minimize the number of cross-overs of the routes taken by the automated guided vehicles. In addition or alternatively, the algorithms can be configured to optimize the timing of operation of respective automated guided vehicles, thereby reducing the likelihood of collision between vehicles. In addition or alternatively, the algorithms can be configured to optimize or maximize the speed of respective automated guided vehicles. In addition or alternatively, the algorithms can be configured to optimize or minimize the time required to complete a particular project of moving pallets in a warehouse.

In addition or alternatively, multiple lanes can be defined (e.g., virtual and/or marked lanes), and the algorithms can be configured such that the automated guided vehicles move through the warehouse according rules that coordinate movement of the automated guided vehicles using the lanes. Multiple automated guided vehicles can concurrently transport pallets through the warehouse using the same lanes and control algorithm, each automated guided vehicle travelling on possibly different routes resulting from performance of the same control algorithm. The multiple defined lanes and corresponding control algorithm can be modified and/or replaced on the fly, and the automated guided vehicles can transport pallets using different lanes and a corresponding different control algorithm. Modifying and/or replacing the lanes and corresponding control algorithm can be done in response to changing warehouse conditions, such as currently available automated guided vehicles, and a current job list that specifies pallets to be transported within the warehouse (e.g., pallets to be received from trucks, pallets to be moved from one warehouse location to another warehouse location, and/or pallets to be retrieved from storage and loaded onto trucks).

In some implementations, an automated warehouse system can include a plurality of automated pallet movers, a physical space in which the plurality of automated pallet movers are configured to operate, and a control system configured to provide commands to each of the plurality of automated pallet movers for operating in the physical space. The commands can include a pallet transportation command including a pallet identifier of a pallet to be transported by the automated pallet mover in the physical space, and a destination location to which the pallet is to be transported by the automated pallet mover. The commands can also include a control algorithm command that specifies a control algorithm for moving through the physical space. The automated pallet mover can be configured to transport the pallet to the destination location according to a route resulting from performance of the control algorithm, while one or more of the other automated pallet movers concurrently transport other pallets to other destination locations according to other routes resulting from performance of the same control algorithm.

Other implementations of this aspect include corresponding methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, case the apparatuses to perform the actions.

These and other implementations can include any all, or none of the following features. At least one of the automated pallet movers can be an automated guided vehicle. At least one of the automated pallet movers can include a forklift device. The pallet identifier can be associated with a location of the pallet in the physical space. After providing, to each of the automated pallet movers, the control algorithm command that specifies the control algorithm for moving through the physical space, the control system can provide, to each of the automated pallet movers, a second, different control algorithm command that specifies a second, different control algorithm for moving through the physical space. The control system can be further configured to perform operations including: (i) for each of a plurality of different control algorithms, performing one or more simulations of transporting pallets in the physical space by the plurality of automated pallet movers using the control algorithm, (ii) comparing pallet throughput resulting from simulated use of each control algorithm, and (iii) selecting an optimal control algorithm, the optimal control algorithm corresponding to greatest pallet throughput. The control algorithm command provided by the control system can specify the optimal control algorithm. The route travelled by the pallet mover resulting from performance of the control algorithm can be determined in real time, in response to locations and movements of the other pallet movers in the physical space. The physical space can include a plurality of pallet handling locations, each pallet handling location being a location from which pallets are retrieved and/or to which pallets are transported. At least one pallet handling location can be at the end of a conveyor belt in the physical space. At least one pallet handling location can be a designated area on a floor of the physical space. The plurality of pallet handling locations can be arranged such that a first row of pallet handling locations are located along a first edge of the physical space, and a second row of pallet handling locations are located along a second edge of the physical space different from the first edge. The physical space can include a plurality of lanes between the first and second rows of pallet handling locations, the lanes being configured for use by the automated pallet movers to transport pallets between pallet handling locations according to routes resulting from performance of the control algorithm. The lanes can include virtual lanes and/or marked lanes. The control algorithm and a different control algorithm can each be associated with a different plurality of lanes. The plurality of lanes can include: (i) a looping slow lane located along the first row of pallet handling locations and the second row of pallet handling locations, (ii) a looping fast lane that loops in a same direction as the looping slow lane and is located inside of the looping slow lane, and (iii) a turning lane that is located inside of the looping fast lane. The plurality of lanes can include: (i) a looping slow lane located along the first row of pallet handling locations and the second row of pallet handling locations, (ii) a looping fast lane that loops in a same direction as the looping slow lane and is located inside of the looping slow lane, and (iii) a plurality of buffer lanes that are located inside of the looping fast lane. The plurality of lanes can include: (i) a first looping lane that loops in a clockwise direction along a portion of the first row of pallet handling locations and a portion of the second row of pallet handling locations, and (ii) a second looping lane that loops in a counterclockwise direction along a different portion of the first row of pallet handling locations and a different portion of the second row of pallet handling locations. The plurality of lanes can include: (i) an exterior looping lane that loops along the first row of pallet handling locations and the second row of pallet handling locations, and (ii) a plurality of interior looping lanes that loop in a same direction as the exterior looping lane, each interior looping lane looping within the exterior looping lane.

The technologies described herein may provide one or more of the following advantages. The pallet transportation system described herein can replace conventional pallet transportation devices, such as conveyor belt systems, by automated guided vehicles to intelligently move pallets of goods between different locations in a warehouse, thereby optimizing routes and/or timing of pallet transportation, avoiding collision between different pallets being transported, reducing a transportation time, and reducing operational costs. Further, the pallet transportation system can provide great flexibility in managing pallets in a warehouse because automated guided vehicles allow a large number of possible paths between a particular set of start and end locations, as opposed to a conveyor belt system that provides a limited number of possible routes between the start and end locations. The pallet transportation system can provide redundancy in route selection by allowing a large number of route options between particular start and end positions. An optimal route can be selected from such multiple route options to meet different criteria required in managing pallets in a warehouse. Further, using a control algorithm for operating each of the automated pallet movers according to defined lanes and rules for travelling in the lanes, the pallet transportation system can conserve processing resources, and increase a number of automated pallet movers operating in a pallet transportation area without increasing collisions. An optimal control algorithm for operating the automated pallet movers according to the defined lanes can be determined for current warehouse conditions (e.g., based on simulation results), optimizing throughput of product in the warehouse.

The details of one or more implementations are set forth in the accompanying drawings and the description below. Other features and advantages will be apparent from the description and drawings, and from the claims.

BRIEF DESCRIPTION OF THE DRAWINGS

FIGS. 1A-B depict example systems for controlling automated pallet movers in a warehouse environment.

FIG. 4A depicts an example physical space in which automated pallet movers may operate.

FIGS. 10A-C depict example warehouse environments in which multiple different types of AGVs are used and controlled in traffic patterns so as to improve the overall efficiency of the warehouse

DETAILED DESCRIPTION OF ILLUSTRATIVE EMBODIMENTS

Figure 1B:
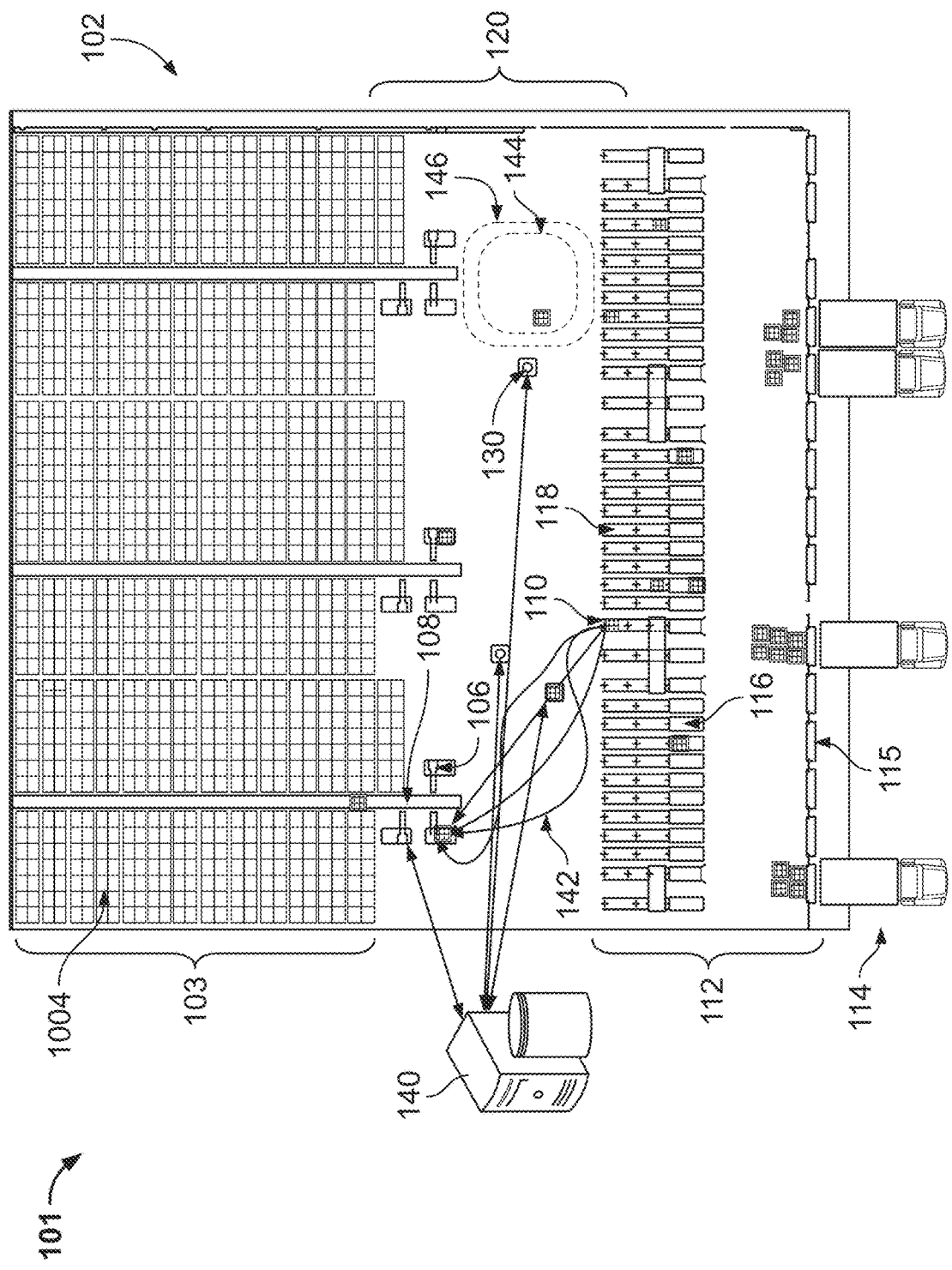

FIG. 1A depicts an example system 100 for controlling automated pallet movers in a warehouse 102, such as a storage warehouse, a distribution center, a retail warehouse, a cold storage warehouse, an overseas warehouse, a packing warehouse, a railway warehouse, a canal warehouse, or another sort of warehouse or facility. In the present example, the warehouse 102 includes a pallet storage area 103, which can include pallet storage racks 104 which can be arranged in rows and/or columns and configured to store pallets 110 in different levels. One or more elevators 106 and rack conveyor belts 108 may be used to elevate pallets 110 to different levels and move them into desired locations in the racks 104. The warehouse 102 can include a staging area 112 (e.g., a loading/unloading area) to move pallets in and out of trucks 114 through doors 115. For example, manual labor can be used to unload pallets from trucks 114 and deliver them onto decks 116, and/or to pick pallets up from the decks 116 and load them onto trucks 114. In addition or alternatively, loading/unloading and/or transportation in the staging area 112 can be performed using an automated system that includes automated pallet movers, such as automated guided vehicles (AGVs) described herein. For example, automated pallet movers including forklift devices for engaging, raising, and lowering pallets may be used to transfer pallets between trucks 114 and decks 116. As another example, such automated pallet movers may transfer pallets between trucks 114 and the pallet storage area 103.

In the present example, the warehouse 102 further includes a pallet transportation area 120 in which the system 100 operates to automate and optimize transportation of pallets between the staging area 112 and the pallet storage area 103. The system 100, for example, can include automated pallet movers 130 to transport pallets 110 in the pallet transportation area 120. For example, the automated pallet movers 130 may be configured to automatically navigate between the staging area 112 and the pallet storage area 103, and may be capable of picking up, moving, and dropping off pallets. The automated pallet movers 130, for example, may include a forklift device for engaging, raising, and lowering the pallets, and/or may be configured to carry pallets on their top surface, and to load/unload pallets to other equipment (e.g., decks, conveyors, forklifts, etc.) when the pallets are positioned at an appropriate height.

In the present example, the system 100 can include a computing device 140 for controlling automated pallet movers 130 and/or other devices and systems in the warehouse 102. Although a single computing device 140 (e.g., a network server) is illustrated and primarily described herein, multiple computing devices (e.g., multiple servers) can be configured to perform same or similar functions. The computing device 140, for example, can be configured to communicate with automated pallet movers 130 and/or other devices and systems (e.g., elevators 106, rack conveyor belts 108, etc.), and to manage and optimize transportation of pallets in the warehouse 102.

FIG. 1B depicts another example system 101 for controlling automated pallet movers in the warehouse 102. The system 101 can be similar to the system 100 described herein with respect to FIG. 1A, except that the staging area 112 can optionally include a plurality of staging conveyor belts 118 to automatically deliver pallets to the pallet transportation area 120. The staging conveyor belts 118 can be arranged and routed from the decks 116 to convey pallets between the decks 116 and the pallet transportation area 120.

In some implementations, the automated pallet movers 130 may include automated guided vehicles (AGVs). In general, an AGV is a portable robot that can automatically move and perform several tasks by following predetermined instructions with minimal or no human intervention. For example, the AGV can be a computer-controlled, unmanned electric vehicle controlled by pre-programmed software to move pallets around a warehouse. AGVs are freely moveable. Alternatively or in addition, AGVs can work with guidance devices, such as magnetic tapes, beacons, barcodes, or predefined laser paths that allow the AGVs to travel on fixed or variable paths in a controlled space. Example guidance devices include marked lines or wires on the floor, and/or guidance by using radio waves, vision cameras, magnets, lasers, and/or other technologies for navigation. AGVs can include lasers and/or sensors configured to detect obstacles in its path and trigger them to stop automatically.

In addition or alternatively, AGVs can be configured to autonomously move and perform functions in a warehouse. For example, AGVs can be configured to automatically make decisions when faced with new or unexpected situations. AGVs can be further configured to learn as they encounter new situations. AGVs can operate without direct driver input or pre-configured scripts to control steering, acceleration, and braking. AGVs can use laser-based perception and navigation algorithms to dynamically move through the area in a warehouse. In some implementations, AGVs include onboard intelligence to adapt to changing environments. Further, machine learning capabilities can be used to enable AGVs to become efficient and accurate as they encounter new or unexpected situations. Data can be collected for machine learning which can update a warehouse map (which maps the warehouse and includes zones and points of interest) with learned parameters. AGVs can be configured to learn which routes are the fastest and take optimal paths, even within unpredictable environments. Multiple AGVs can collaboratively interact with other AGVs. In some examples, AGVs do not require external infrastructure for navigation, making implementation hassle-free and highly scalable. AGVs can be configured to detect, avoid, and dynamically move around obstacles (including other AGVs) to continue to their destinations, reducing downtime. Parameters associated with AGVs can be customized to navigate through aisles, personnel zones, narrow corridors, and other regions.

Figure 2A:
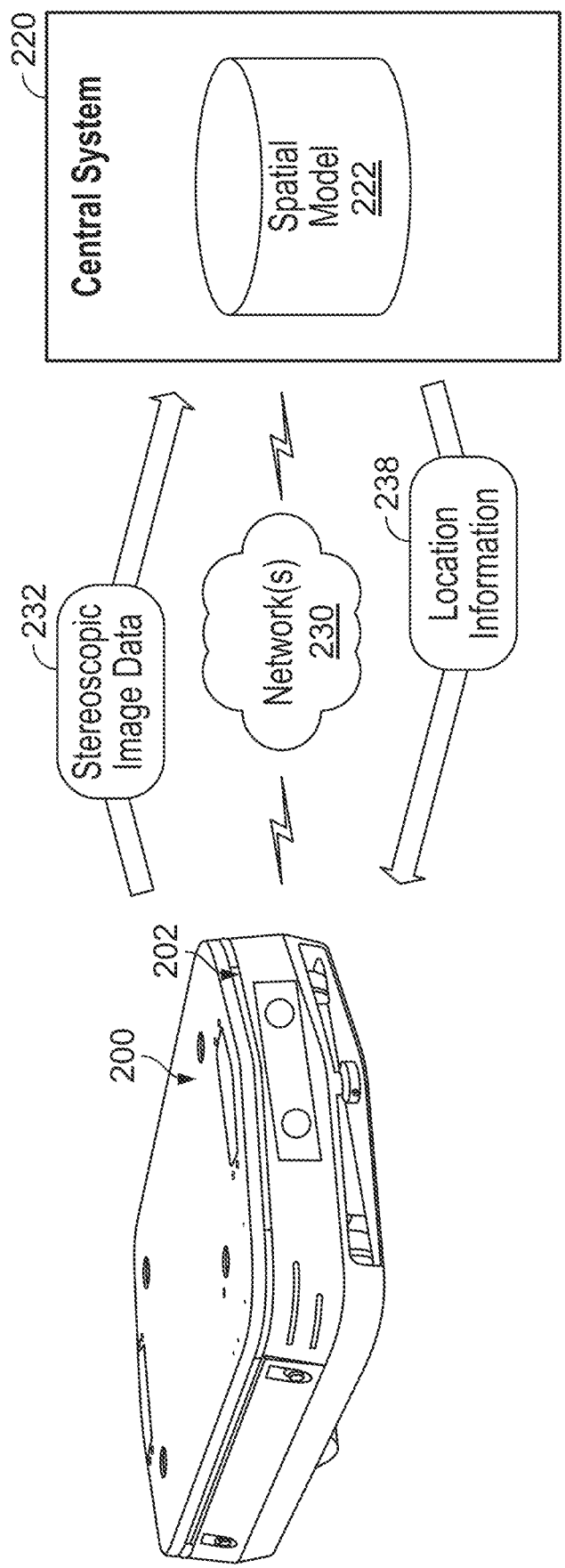
FIGS. 2A-B depict example systems to control operation of automated guided vehicles (AGVs) using stereoscopic vision.
Figure 2B:
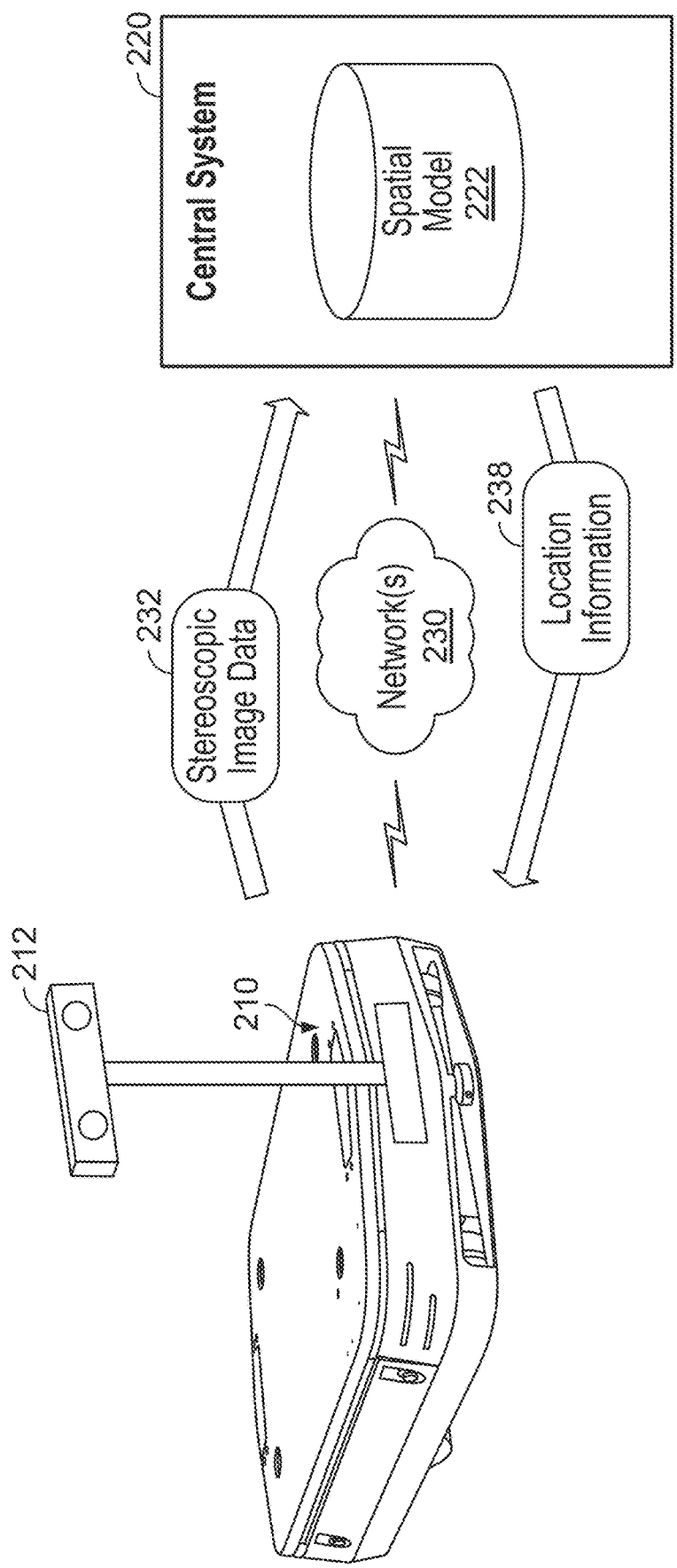

FIGS. 2A-B depict example systems to control operation of automated guided vehicles (AGVs) using stereoscopic vision. Referring to FIG. 2A, an example AGV 200 (e.g., an automated pallet mover 130, shown in FIGS. 1A-B) is depicted with stereoscopic imaging devices 202 (e.g., stereoscopic cameras) mounted on a side (e.g., a front-facing side) of the AGV 200. The AGV 200 may include multiple stereoscopic imaging devices that are positioned on its sides, such as an additional stereoscopic imaging device positioned on an opposing side (e.g., a rear-facing side) of the AGV 200. The stereoscopic image data 232 can be generated by the AGV 200 and used to determine a precise location of the AGV 200 within a physical environment, such as a warehouse. An example system for making such location determination for the AGV 200 can include a central system 220 that contains a spatial model 222 of the environment (e.g., point cloud of the environment). In some instances, the AGV 200 can transmit the stereoscopic image data 232 over one or more networks 230 (e.g., Wi-Fi) to the central system 220, which can generate spatial positioning of features (e.g., points) from the stereoscopic image data 232, compare that spatial positioning of features to the spatial model 222 to determine the location of the AGV 200, and then transmit the location information 238 back to the AGV 200 (or to other systems used to control operation of the AGV 200). Alternatively, the spatial model can be loaded onto the AGV 200 and those determinations can be made locally on the AGV 200. Techniques, systems, devices, and features for using stereoscopic vision to determine a vehicle's location within a warehouse, which can be applied to the AGV 200, are described in U.S. Pat. No. 10,242,273, entitled TRACKING VEHICLES IN A WAREHOUSE ENVIRONMENT, issued Mar. 26, 2019, the entire contents of which are incorporated by reference.

Referring to FIG. 2B, another example AGV 210 (e.g., similar to AGVs 130, shown in FIGS. 1A-B) is depicted. In this example, the stereoscopic imaging device 212 is positioned and extends above a top surface of the AGV 210. Such a positioning of the stereoscopic imaging device 212 can provide a higher vantage point (higher relative to the ground), which may be used to generate more spatial positioning features (e.g., points) that can be used to more accurately determine the location of the AGV 210 using the spatial model 222.

Referring again to FIGS. 1A-B, for example, the systems 100 (shown in FIG. 1A) and/or 101 (shown in FIG. 1B) can be configured to optimize operation of automated pallet movers 130 in the warehouse 102 using various algorithms. In some implementations, the various algorithms may be configured to calculate a plurality of possible routes 142 for each automated pallet mover from a start location to an end location, and to determine an optimal route among them. For example, the algorithms can be configured to choose a shortest route for at least one of the automated pallet movers. In addition or alternatively, the algorithms can be configured to minimize the number of cross-overs of the routes taken by multiple automated pallet movers, thereby reducing the likelihood of collision between automated pallet movers. In addition or alternatively, the algorithms can be configured to optimize the timing of operation of respective automated pallet movers, thereby reducing the likelihood of collision between automated pallet movers. In addition or alternatively, the algorithms can be configured to maximize the speed of at least one of the automated pallet movers. In addition or alternatively, the algorithms can be configured to minimize the time required to complete a particular project of moving pallets in a warehouse. In some implementations, multiple lanes 144, 146 may be defined within the warehouse 102, and the various algorithms may include rules for operating the automated pallet movers using the lanes. For example, the algorithms can be used to coordinate operation of multiple pallet movers, each automated pallet mover concurrently transporting pallets through the warehouse according to routes that result from execution of the algorithm.

As shown in FIGS. 1A-B, for example, pallet transportation area 120 may be partitioned into one or more zones, each zone possibly being associated with different algorithms for optimizing operation of automated pallet movers 130 and/or coordinating operation of the automated pallet movers. For example, in a first zone, optimal routes 142 may be specifically determined for each of the automated pallet movers 130, whereas in a second zone, a general control algorithm may be used for coordinating movement of the automated pallet movers 130 according to the lanes 144, 146. In the present example, the first zone may include lighter and/or more irregular traffic of the automated pallet movers 130, whereas in the second zone, heavier and/or more regular traffic of the automated pallet movers 130 may be present or anticipated (e.g., due to an incoming shipment of pallets to be stored in a common section of the pallet storage area 103, or an outgoing shipment of pallets to be transported by one of the trucks 114). As another example, each zone may be associated with a different general control algorithm. As another example, an entire pallet transportation area 120 may use route optimization algorithms for each automated pallet mover 130, or a single general control algorithm for all of the automated pallet movers 130.

Figure 3:
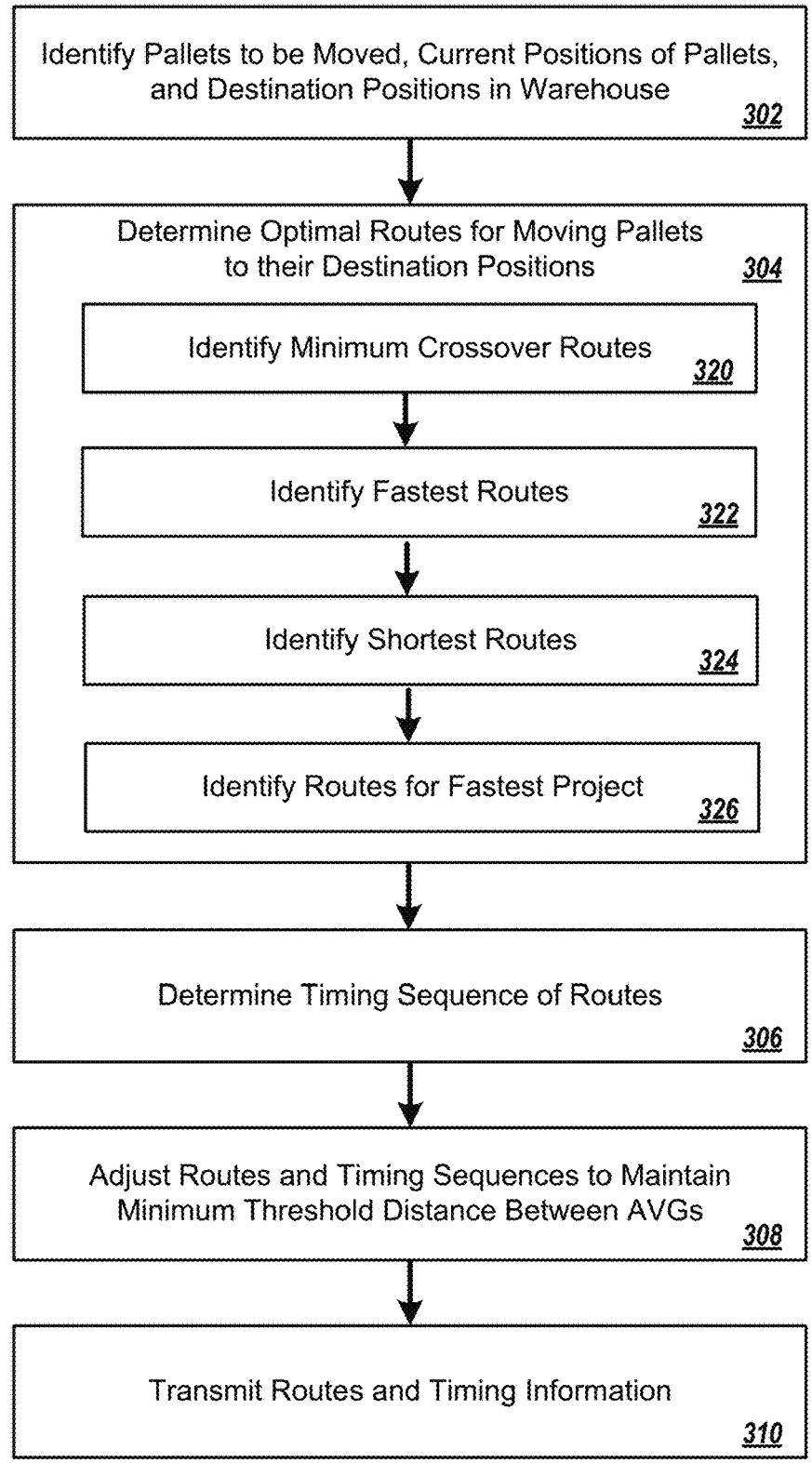
FIG. 3 is a flowchart of an example technique for determining optimal routes for transporting pallets in a warehouse environment.

Referring now to FIG. 3, for example, a flowchart of an example technique 300 for determining optimal routes for transporting pallets in a warehouse environment. The example technique 300 can be performed by any of a variety of appropriate systems, such as the example systems depicted in FIGS. 1A-B. The technique 300, for example, can be used to determine optimal routes to move pallets in a warehouse, such as routes between staging area 112 (e.g., pallet loading/unloading area) and pallet storage area 103 (e.g., pallet storage racks). At 302, identification of the pallets to be moved, their current positioning, and their destination positioning can be determined. At 304, optimal routes are determined for moving pallets to their destination positions. For example, optimal routes can be determined by identifying routes that provide minimum crossovers there between when the pallets are transported to their destination positions along those routes (320), by identifying fastest routes for moving pallets to their destination positions (322), by identifying shortest routes for moving pallets to their destination positions (324), and/or by identifying routes that result in fastest completion of a project of moving entire pallets in desired manner (326). At 306, once optimal routes are determined, timing sequences for the routes can be determined. At 308, routes and timing sequences can be adjusted in order to avoid collisions and to maintain a minimum threshold distance between the automated pallet movers. At 310, such adjusted routes and timings can then be provided for use to control operation of the automated pallet movers to execute on the determinations.

In general, determining a plurality of possible routes and determining an optimal routes for each of the automated pallet movers may be computationally expensive, and may become more complex as a number of automated pallet movers operating in a warehouse environment increases. As such, performing the example technique 300 may be appropriate when a number of automated pallet movers is below a threshold number and/or when suitable computing resources are available.

In some implementations, the algorithms can be configured to employ various defined lanes in a physical space, and to define a common set of rules to be followed by each of the automated pallet movers for navigating through the space according to the lanes, from a start location to and end location. Referring again to FIGS. 1A-B, for example, the lanes 144, 146 can include virtual and/or marked regions in the pallet transportation area 120 that are defined by one or more computing devices in a system for controlling automated pallet movers (e.g., computing device 140), and are associated with one or more movement rules that are to be followed by the automated pallet movers 130 that travel in the lanes (e.g., maximum speed, minimum speed, rate of acceleration/deceleration, direction of travel, right of way, etc.). Virtual lanes, for example, can be regions in the pallet transportation area 120 that are not physically marked, but can be logically identified by the automated pallet movers 130 using location sensors and digital maps. Marked lanes, for example, may be regions in the pallet transportation area 120 that are physically identifiable by the automated pallet movers 130 (e.g., painted lanes that can be detected using cameras, light-bounded lanes that can be detected using light sensors, metal lanes that can be detected using magnetic sensors, etc.). By using a same control algorithm for operating each of the automated pallet movers 130 according to defined lanes, for example, interactions between the automated pallet movers may be simplified, processing resources may be conserved, and a number of automated pallet movers operating in the pallet transportation area 120 may be increased.

In general, operation of the automated pallet movers in physical spaces can include a control system for coordinating movement of multiple automated pallet movers by providing commands to the automated pallet movers. For example, the computing device 140 can provide a pallet transportation command to the automated pallet mover 130 that includes a pallet identifier of pallet 110 to be transported by the automated pallet mover 130, and a destination location to which the pallet 110 is to be transported. The pallet identifier, for example, can be and/or can include a current and/or an anticipated location of the pallet 110 in the physical space (e.g., the transportation area 120). For example, the current and/or anticipated location of the pallet 110 can be a location of one of the decks 116, a location at the end of staging conveyor belt 118, a designated floor location within the staging area 112, a location within one of the trucks 114, or another suitable location. As another example, the automated pallet mover 130 can use the pallet identifier to search for and locate the pallet 110 in the staging area 112 or one of the trucks 114. The destination location, for example, can be a location of one of the elevators 106 or a location associated with one of the rack conveyor belts 108 that is configured to deliver the pallet 110 to its designated pallet storage rack 104 in the pallet storage area 103. As another example, the destination location can be a designated floor location in or near the pallet storage area 103.

Prior to or in addition to providing the pallet transportation command, for example, the computing device 140 can provide a control algorithm command to the automated pallet mover 130 that specifies a control algorithm for moving through the physical space (e.g., the transportation area 120). Rather than transporting the pallet 110 according to one of the routes 142, for example, the automated pallet mover 130 can be configured to move to a pick up location of the pallet 110 and to transport the pallet 110 from its pick up location to its destination location according to a route resulting from performance of the specified control algorithm, while other automated pallet movers concurrently transport other pallets to other destination locations according to other routes (e.g., potentially different routes) also resulting from performance of the same control algorithm. In some implementations, a route travelled by a pallet mover resulting from performance of the control algorithm may be determined in real time, in response to locations and movements of the other pallet movers in the physical space. For example, as the automated pallet mover 130 moves through the transportation area 120, it may encounter other automated pallet movers. Rather than determining a specific route for the automated pallet mover 130 before it begins transporting the pallet 110, for example, the route can be determined as the pallet 110 is being transported, based on continually changing traffic conditions and other factors that may occur in the transportation area 120.

Various example physical spaces (e.g., pallet transportation areas) in which automated pallet movers may operate, various lane configurations within the physical spaces, and various control algorithms for operating the automated pallet movers in the physical spaces are described below with respect to FIGS. 4-7, however, other physical spaces, lane configurations, and control algorithms are possible. In general, automated pallet movers may be configured to travel relatively quickly when moving in a straight line, but not when changing directions. Further, the automated pallet movers may be configured to travel more quickly when using wide lanes than when using narrow lanes. The traffic flow techniques resulting from the various control algorithms, for example, can maximize the speed of the automated pallet movers by providing them with suitably wide lanes of traffic, while still providing possible shortcuts for reaching destinations.

Referring now to FIG. 4A, an example physical space 400 in which automated pallet movers may operate is depicted. Similar to FIGS. 1A-B, for example, the example physical space 400 includes staging area 112, transportation area 120, and pallet storage area 103. In some configurations, a physical space can include a plurality of pallet handling locations, each pallet handling location being a location from which pallets may be retrieved and/or to which pallets may be transported. For example, the physical space 400 includes pallet handling locations 402a-n. In some configurations, pallet handling locations may be arranged such that a first row of pallet handling locations are located along a first edge of a physical space, and a second row of pallet handling locations are located along a second edge of the physical space that is different from the first edge. For example, pallet handling locations 402a-c are located at an edge of the transportation area 120 that is adjacent to the staging area 112, whereas pallet handling locations 402d-n are located at an opposite edge of the transportation area 120 that is adjacent to the pallet storage area 103.

In the present example, the physical space 400 includes a plurality of lanes 410a-c between the first and second rows of pallet handling locations 402a-n, the lanes 410a-c being configured for use by automated pallet movers 130a-n to transport pallets between the pallet handling locations 402a-n according to routes resulting from performance of a control algorithm for operating according to the lanes 410a-c. Lane 410a, for example, can be a looping slow lane located along the first row of pallet handling locations 402a-c and the second row of pallet handling locations 402d-n. Lane 410b, for example, can be a looping fast lane that loops in a same direction (e.g., clockwise or counterclockwise) as the looping slow lane 410a, and can be located inside of the looping slow lane 410a. Lane 410c, for example, can be a turning lane that is located inside of the looping fast lane 410b.

Figure 4B:
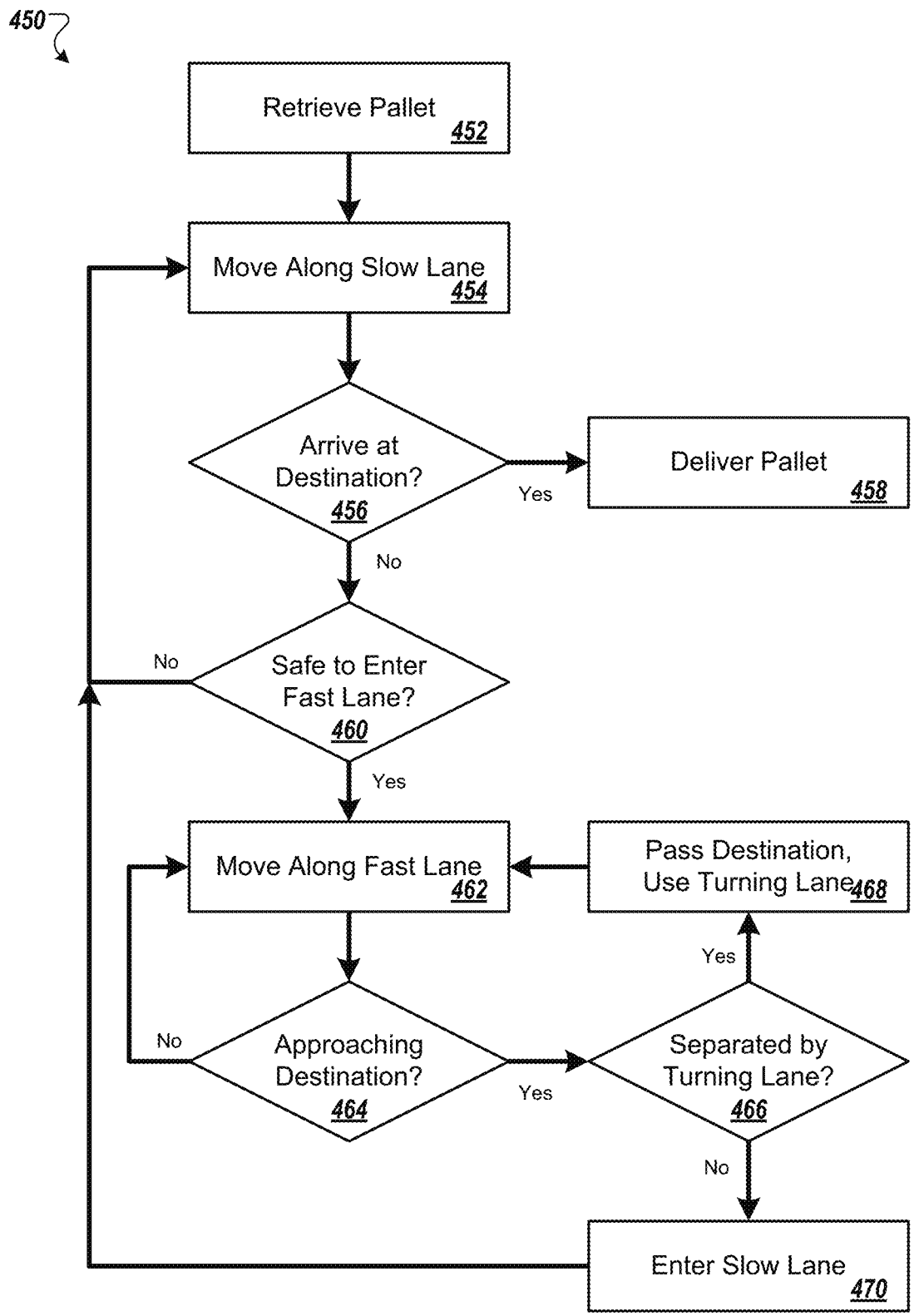
FIG. 4B is flowchart of an example technique for operating automated pallet movers in the example physical space depicted in FIG. 4A.

FIG. 4B is flowchart 450 of an example technique for operating automated pallet movers in the example physical space 400 depicted in FIG. 4A, according to the plurality of lanes 410a-c. A pallet can be retrieved (452). For example, the automated pallet mover 130a can move to pallet handling location 402b and retrieve a pallet that is waiting at that location. After retrieving the pallet, for example, the automated pallet mover 130a can enter and move along the looping slow lane 410a (454). If the automated pallet mover 130a arrives at its destination while travelling in the looping slow lane 410a (456), it may deliver its pallet (458). For example, if the destination location is close to the retrieval location (e.g., pallet handling location 402c is the destination location), the automated pallet mover 130a may continue travelling in the looping slow lane 410a until it reaches the destination location, and then it may deliver its pallet after it has stopped at the destination location.

If the automated pallet mover 130a has not yet arrived at the destination location while travelling in the looping slow lane 410a, it can determine whether it is safe to enter the looping fast lane 410b (460). For example, based on information provided to the automated pallet mover 130a by a control system (e.g., computing device 140) regarding locations and speeds of other pallet movers 130n operating in the transportation area 120 and/or based on information collected by its own sensors, the automated pallet mover 130a can determine whether a transition into the looping fast lane 410b is safe, or whether the transition would result in a collision or would impede another automated pallet mover. If such a transition is determined to be unsafe, the automated pallet mover 130a can continue moving along the looping slow lane 410a (454). If such a transition is determined to be safe, the automated pallet mover 130a can transition into the looping fast lane 410b and begin moving along the looping fast lane 410b (462).

While moving along the looping fast lane 410b (462), for example, the automated pallet mover 130a can continually determine whether it is approaching its destination location (464). If the automated pallet mover 130a determines that it is not close to its destination location (e.g., based on a line that runs perpendicular to the looping fast lane 410b at the current location of the automated pallet mover 130a not being within a threshold distance of the location), for example, the automated pallet mover 130a may continue moving along the looping fast lane 410b (462).

If the automated pallet mover 130a determines that it is close to its destination location (e.g., based on a line that runs perpendicular to the looping fast lane 410b at the current location of the automated pallet mover 130a being within a threshold distance of the location), for example, the automated pallet mover 130a may determine whether it is separated from its destination location by the turning lane 410c at its current location (466). For example, while travelling in the looping fast lane 410b, the automated pallet mover 130a may determine that it is approaching its destination location (e.g., pallet handling location 402e), but that it is separated by turning lane 410c. In the present example, the automated pallet mover 130a can pass its destination location by a suitable distance (e.g., along an x-axis of the transportation area 120), then use the turning lane 410c (468) to enter and cross or move along the fast lane 410b in the opposing direction (462), then quickly approach its destination (464), determine that it is no longer separated by the turning lane 410c (466), and enter the slow lane 410a (470).

If the automated pallet mover 130a has looped around the transportation area 120 using the fast lane 410b (e.g., due to its destination location being at the end of a row of pallet handling locations and/or due to traffic conditions within the various loops), for example, the automated pallet mover 130a may determine that it is approaching its destination (464), but that it is not separated by the turning lane 410c (466). In the present example, the automated pallet mover 130a can enter the slow lane 410a (470) without using the turning lane 410c.

When moving along the slow lane 410a (454), for example, the automated pallet mover 130a may determine that it has arrived at its destination location (456), and then it may deliver its pallet (458) at the destination location. After delivering its pallet, for example, the automated pallet mover 130a may receive another job from the control system, may proceed to a wait area (not shown), may proceed to a charging station (not shown), or may perform another suitable operation.

Figure 5A:
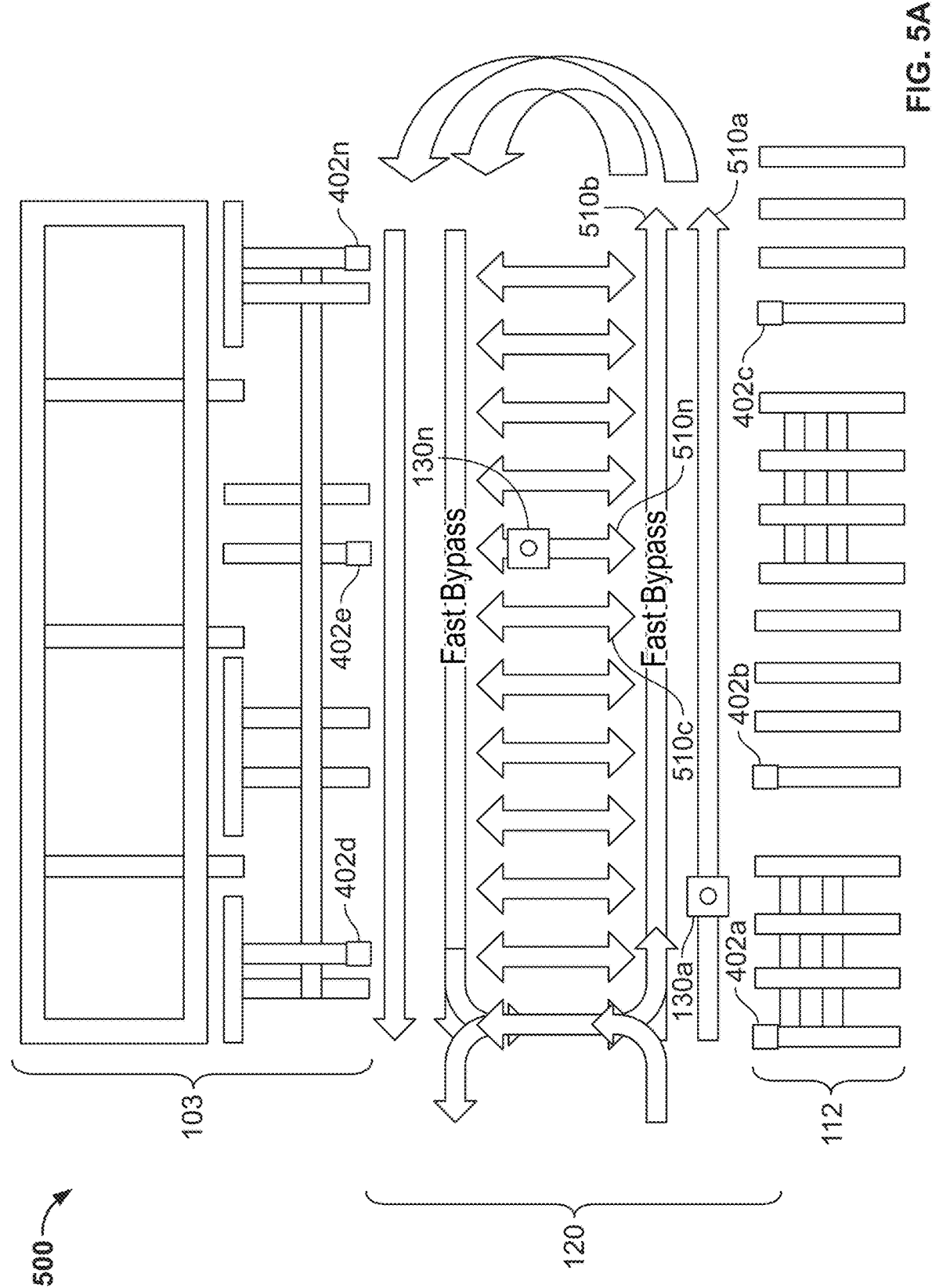
FIG. 5A depicts an example physical space in which automated pallet movers may operate.

Referring now to FIG. 5A, an example physical space 500 in which automated pallet movers may operate is depicted. Similar to FIGS. 1A-B and 4A, for example, the example physical space 500 includes staging area 112, transportation area 120, and pallet storage area 103. Similar to FIG. 4A, for example, the physical space 500 also includes pallet handling locations 402a-n.

In the present example, the physical space 500 includes a plurality of lanes 510a-n between the first and second rows of pallet handling locations 402a-n, the lanes 510a-n being configured for use by automated pallet movers 130a-n to transport pallets between the pallet handling locations 402a-n according to routes resulting from performance of a control algorithm for operating according to the lanes 510a-n. Lane 510a, for example, can be a looping slow lane located along the first row of pallet handling locations 402a-c and the second row of pallet handling locations 402d-n. Lane 510b, for example, can be a looping fast lane that loops in a same direction (e.g., clockwise or counterclockwise) as the looping slow lane 510a, and can be located inside of the looping slow lane 510a. Lanes 510c-n, for example, can be buffer lanes that are located inside of the looping fast lane 510b and run perpendicular to the looping fast lane 510b.

Figure 5B:
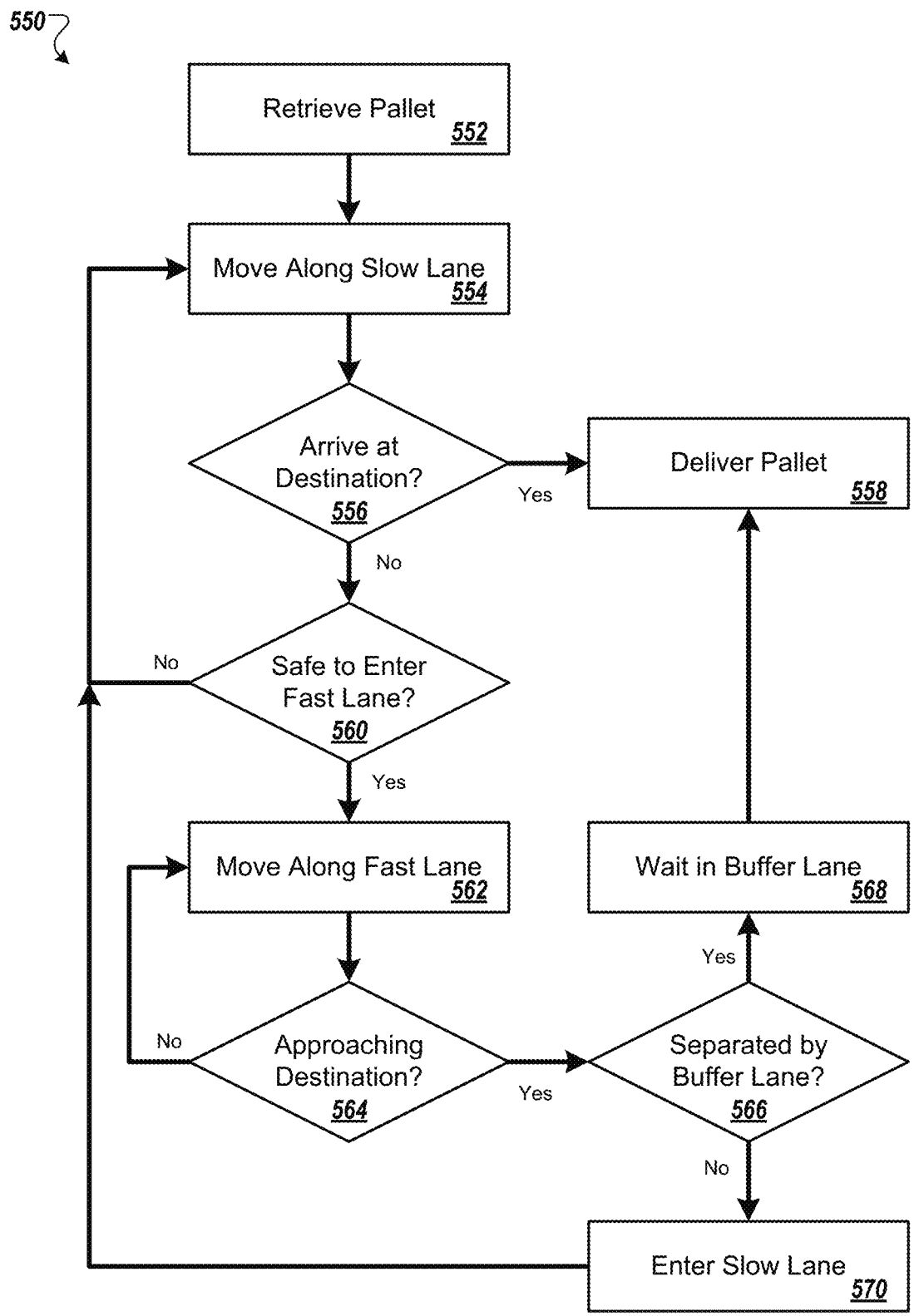
FIG. 5B is flowchart of an example technique for operating automated pallet movers in the example physical space depicted in FIG. 5A.

FIG. 5B is flowchart of an example technique for operating automated pallet movers in the example physical space 500 depicted in FIG. 5A, according to the plurality of lanes 510a-n. A pallet can be retrieved (552). For example, the automated pallet mover 130a can move to pallet handling location 402b and retrieve a pallet that is waiting at that location. After retrieving the pallet, for example, the automated pallet mover 130a can enter and move along the looping slow lane 510a (554). If the automated pallet mover 130a arrives at its destination while travelling in the looping slow lane 510a (556), it may deliver its pallet (558). For example, if the destination location is close to the retrieval location (e.g., pallet handling location 402c is the destination location), the automated pallet mover 130a may continue travelling in the looping slow lane 510a until it reaches the destination location, and then it may deliver its pallet after it has stopped at the destination location.

If the automated pallet mover 130a has not yet arrived at the destination location while travelling in the looping slow lane 410a, it can determine whether it is safe to enter the looping fast lane 510b (560). For example, based on information provided to the automated pallet mover 130a by a control system (e.g., computing device 140) regarding locations and speeds of other pallet movers 130n operating in the transportation area 120 and/or based on information collected by its own sensors, the automated pallet mover 130a can determine whether a transition into the looping fast lane 510b is safe, or whether the transition would result in a collision or would impede another automated pallet mover. If such a transition is determined to be unsafe, the automated pallet mover 130a can continue moving along the looping slow lane 510a (554). If such a transition is determined to be safe, the automated pallet mover 130a can transition into the looping fast lane 510b and begin moving along the looping fast lane 510b (562).

While moving along the looping fast lane 510b (562), for example, the automated pallet mover 130a can continually determine whether it is approaching its destination location (564). If the automated pallet mover 130a determines that it is not close to its destination location (e.g., based on a line that runs perpendicular to the looping fast lane 510b at the current location of the automated pallet mover 130a not being within a threshold distance of the location), for example, the automated pallet mover 130a may continue moving along the looping fast lane 510b (562).

If the automated pallet mover 130a determines that it is close to its destination location (e.g., based a line that runs perpendicular to the looping fast lane 510b at the current location of the automated pallet mover 130a being within a threshold distance of the location), for example, the automated pallet mover 130a may determine whether it is separated from its destination location by one of the buffer lanes 510c-n at its current location (566). For example, while travelling in the looping fast lane 510b, the automated pallet mover 130a may determine that it is approaching its destination location (e.g., pallet handling location 402e), but that it is separated by buffer lane 510n. In the present example, the automated pallet mover 130a can turn and enter buffer lane 510n, and may potentially wait in the buffer lane 510n (568) while one or more other automated pallet movers (e.g., automated pallet mover 130n) use the buffer lane 510n and/or deliver pallets to the destination location (e.g., pallet handling location 402c). In the present example, after waiting for its turn to clear the buffer lane 510n, the automated pallet mover 130a can proceed to deliver its pallet (558).

If the automated pallet mover 130a has looped around the transportation area 120 using the fast lane 510b (e.g., due to its destination location being at the end of a row of pallet handling locations and/or due to traffic conditions within the various loops), for example, the automated pallet mover 130a may determine that it is approaching its destination (564), but that it is not separated by any of the buffer lanes 510c-n (566). In the present example, the automated pallet mover 130a can enter the slow lane 510a (570) without using the buffer lane 510c.

When moving along the slow lane 510a (554), for example, the automated pallet mover 130a may determine that it has arrived at its destination location (556), and then it may deliver its pallet (558) at the destination location. After delivering its pallet, for example, the automated pallet mover 130a may receive another job from the control system, may proceed to a wait area (not shown), may proceed to a charging station (not shown), or may perform another suitable operation.

Figure 6A:
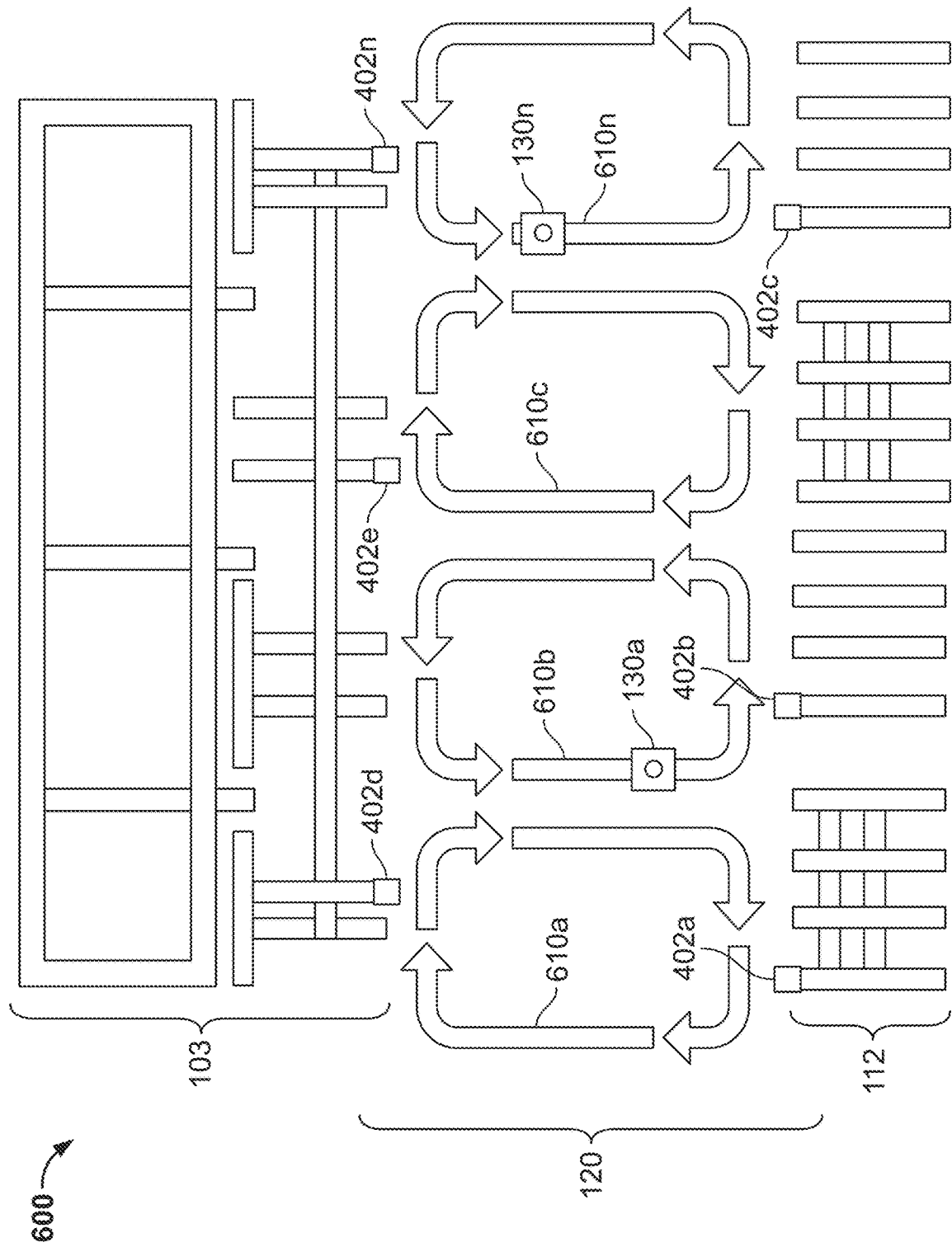
FIG. 6A depicts an example physical space in which automated pallet movers may operate.

Referring now to FIG. 6A, an example physical space 600 in which automated pallet movers may operate is depicted. Similar to FIGS. 1A-B, 4A, and 5A, for example, the example physical space 600 includes staging area 112, transportation area 120, and pallet storage area 103. Similar to FIGS. 4A and 5A, for example, the physical space 600 also includes pallet handling locations 402a-n.

In the present example, the physical space 600 includes a plurality of lanes 610a-n being configured for use by automated pallet movers 130a-n to transport pallets between the pallet handling locations 402a-n according to routes resulting from performance of a control algorithm for operating according to the lanes 610a-n. In general, the lanes 610a-n can be a series of looping lanes, each lane looping along a different portion of the first and second rows of pallet handling locations, and each adjacent lane looping in a different direction. Lane 610a, for example, can loop in a clockwise direction along a portion of the first row of pallet handling locations (e.g., a portion including pallet handling location 402a) and a portion of the second row of pallet handling locations (e.g., a portion including pallet handling location 402d). Lane 610b, for example, can loop in a counterclockwise direction along a different, adjacent portion of the first row of pallet handling locations (e.g., a portion including pallet handling location 402b), and a different, adjacent portion of the second row of pallet handling locations. Lane 610c, for example, can loop in a clockwise direction along a different, adjacent portion of the first row of pallet handling locations, and a different, adjacent portion of the second row of pallet handling locations (e.g., a portion including pallet handling location 402c). Lane 610n, for example, can loop in a counterclockwise direction along a different, adjacent portion of the first row of pallet handling locations (e.g., a portion including pallet handling location 402c), and a different, adjacent portion of the second row of pallet handling locations (e.g., a portion including pallet handling location 402n).

Figure 6B:
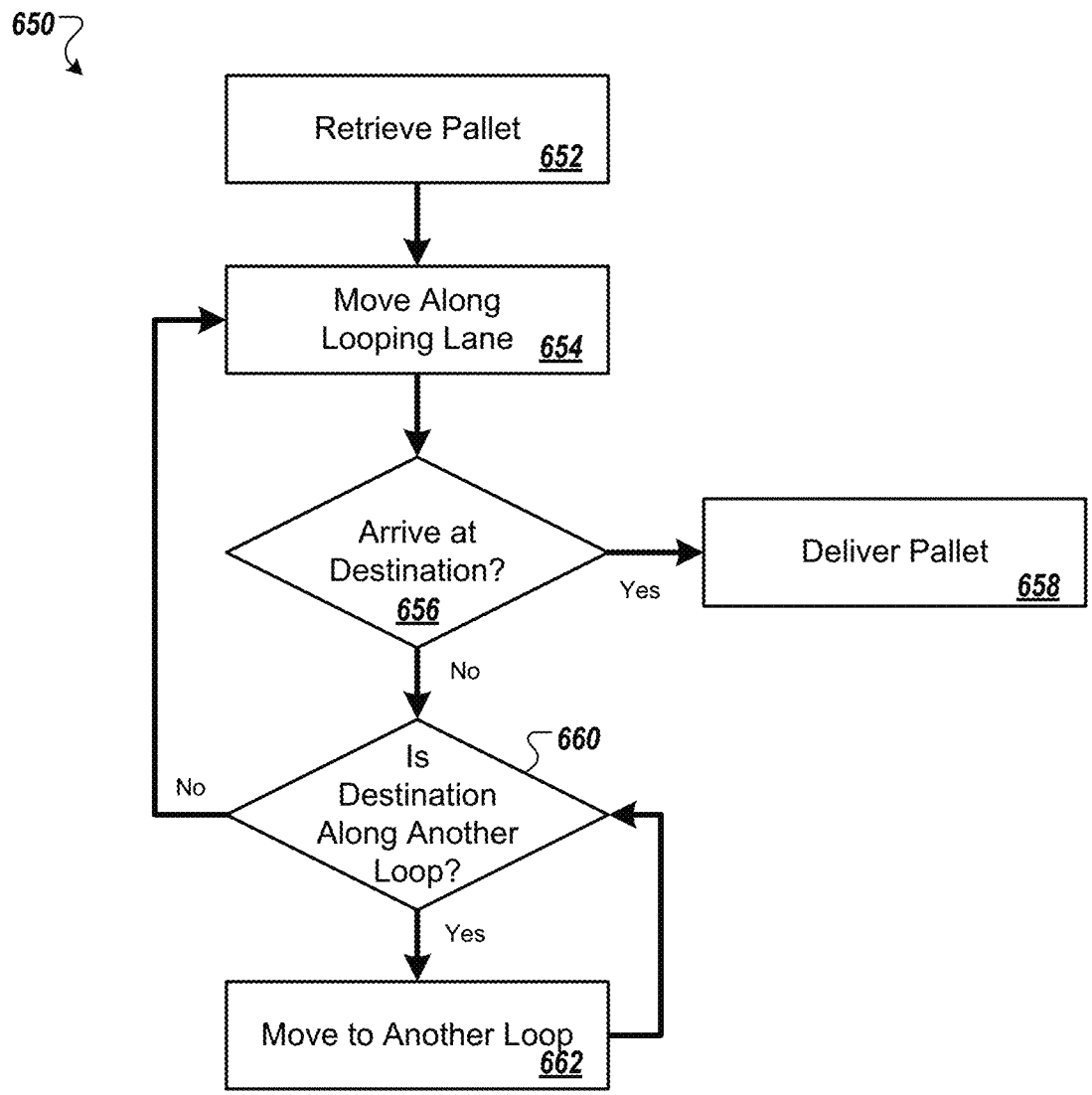
FIG. 6B is flowchart of an example technique for operating automated pallet movers in the example physical space depicted in FIG. 6A.

FIG. 6B is flowchart of an example technique for operating automated pallet movers in the example physical space depicted in FIG. 6A, according to the plurality of lanes 610a-n A pallet can be retrieved (652). For example, the automated pallet mover 130a can move to pallet handling location 402b and retrieve a pallet that is waiting at that location. After retrieving the pallet, for example, the automated pallet mover 130a can enter and move along the looping lane 610b (654). While moving along the looping lane 610b, for example, the automated pallet mover 130a can continually determine whether it has arrived its destination location (656). If the automated pallet mover 130a arrives at its destination while travelling in the looping lane 610b, for example, it may deliver its pallet (658). If the automated pallet mover 130a has not yet arrived at its destination location, but has determined (660) that its destination is not along another loop, the automated pallet mover 130a can continue moving along its current looping lane 610b (654) until it arrives at its destination.

If, however, the automated pallet mover 130a has not yet arrived at its destination location, and has determined (660) that its destination location is along another loop (e.g., pallet handling location 402e, located along loop 610c), the automated pallet mover 130a can move to the other loop (662). In the present example, the automated pallet mover 130a can merge from the counterclockwise looping lane 610b into the clockwise looping lane 610c at a section where the two lanes are adjacent to each other. Moving from one loop to another can be performed by the automated pallet mover 130a, for example, until the automated pallet mover determines (660) that its destination is not along a different loop.

When moving along a looping lane which can provide access to its destination location (654), for example, the automated pallet mover 130a may determine that it has arrived at its destination location (656), and then it may deliver its pallet (658) at the destination location. After delivering its pallet, for example, the automated pallet mover 130a may receive another job from the control system, may proceed to a wait area (not shown), may proceed to a charging station (not shown), or may perform another suitable operation.

Figure 7A:
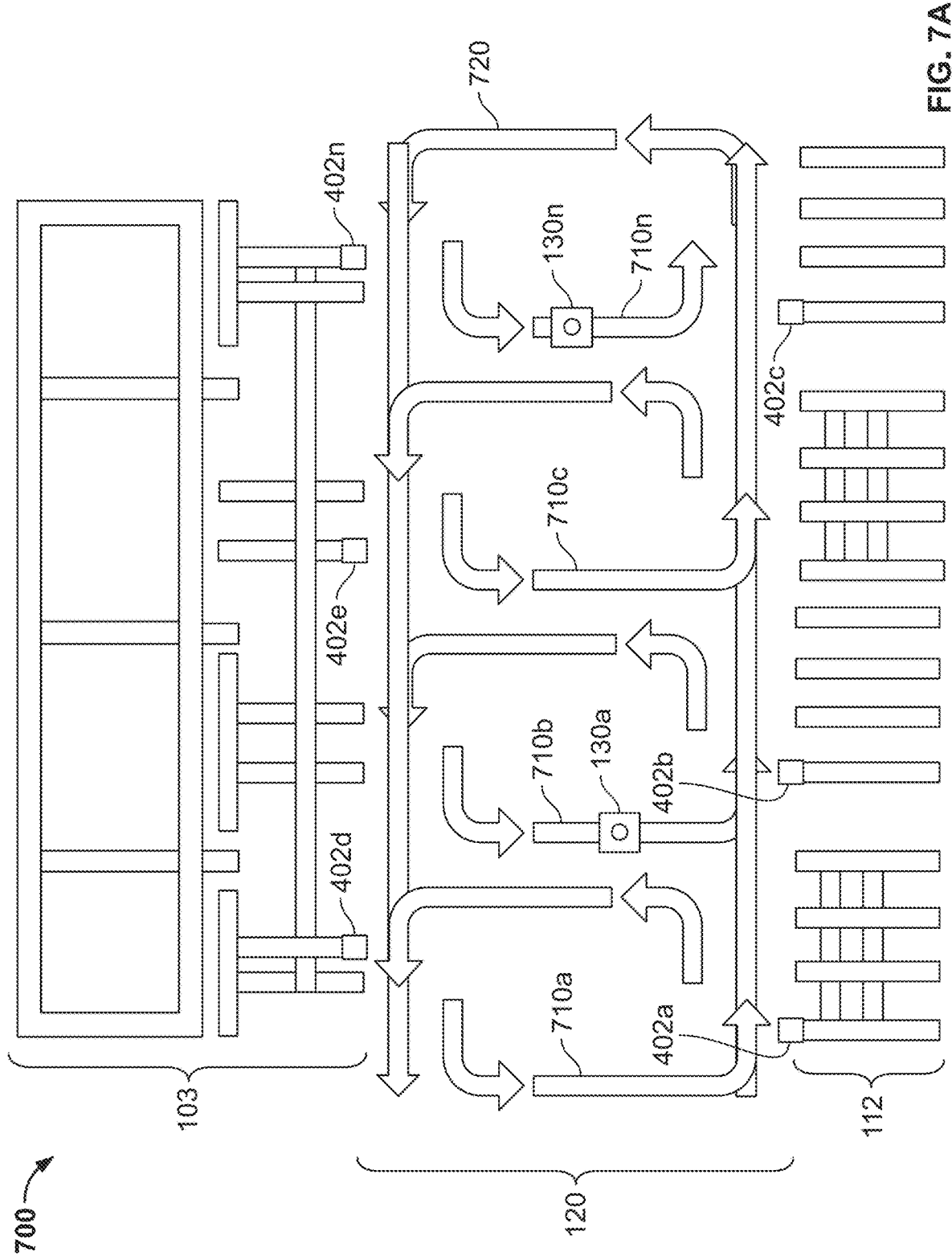
FIG. 7A depicts an example physical space in which automated pallet movers may operate.

Referring now to FIG. 7A, an example physical space 700 in which automated pallet movers may operate is depicted. Similar to FIGS. 1A-B, 4A, 5A, and 6A, for example, the example physical space 700 includes staging area 112, transportation area 120, and pallet storage area 103. Similar to FIGS. 4A, 5A, and 6A, for example, the physical space 700 also includes pallet handling locations 402a-n.

In the present example, the physical space 700 includes a plurality of lanes 710a-n, 720, being configured for use by automated pallet movers 130a-n to transport pallets between the pallet handling locations 402a-n according to routes resulting from performance of a control algorithm for operating according to the lanes 710a-n, 720. Lane 720, for example, can be an exterior looping lane that loops along the first row of pallet handling locations (e.g., including pallet handling locations 402a-c) and the second row of pallet handling locations (e.g., including pallet handling locations 402d-n). In general, the lanes 710a-n can be a series of interior looping lanes, each lane looping along a different portion of the first and second rows of pallet handling locations, each lane looping in a same direction (e.g., clockwise or counterclockwise) as the exterior looping lane 720, and each lane overlapping with portions of exterior looping lane 720. Lane 710a, for example, can loop along a portion of the first row of pallet handling locations (e.g., a portion including pallet handling location 402a) and a portion of the second row of pallet handling locations (e.g., a portion including pallet handling location 402d). Lane 710b, for example, can loop along a different, adjacent portion of the first row of pallet handling locations (e.g., a portion including pallet handling location 402b), and a different, adjacent portion of the second row of pallet handling locations. Lane 710c, for example, can loop along a different, adjacent portion of the first row of pallet handling locations, and a different, adjacent portion of the second row of pallet handling locations (e.g., a portion including pallet handling location 402c). Lane 710n, for example, can loop along a different, adjacent portion of the first row of pallet handling locations (e.g., a portion including pallet handling location 402c), and a different, adjacent portion of the second row of pallet handling locations (e.g., a portion including pallet handling location 402n).

Figure 7B:
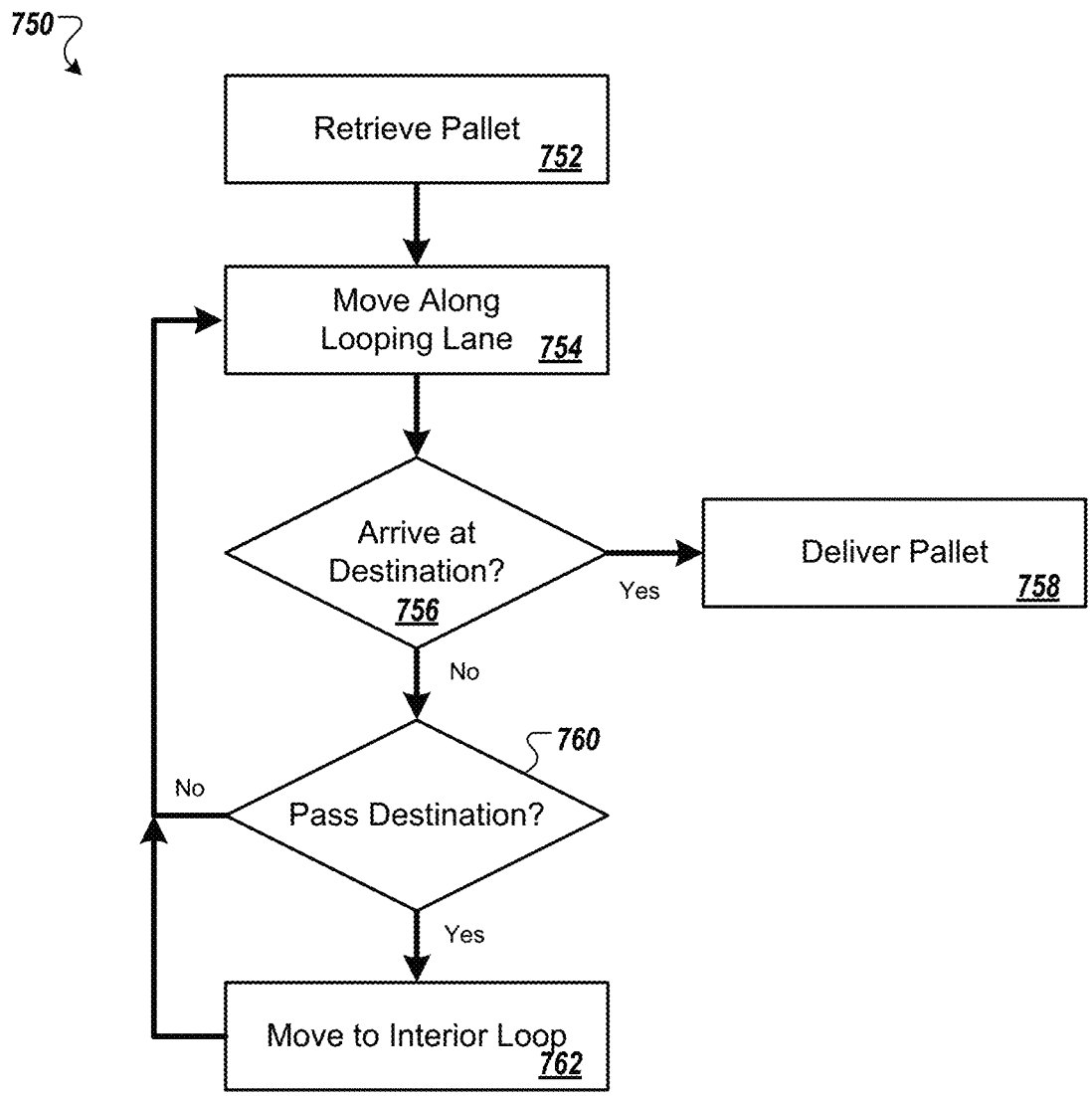
FIG. 7B is flowchart of an example technique for operating automated pallet movers in the example physical space depicted in FIG. 7A.

FIG. 7B is flowchart of an example technique for operating automated pallet movers in the example physical space depicted in FIG. 7A, according to the plurality of lanes 710a-n, 720. A pallet can be retrieved (752). For example, the automated pallet mover 130a can move to pallet handling location 402b and retrieve a pallet that is waiting at that location. After retrieving the pallet, for example, the automated pallet mover 130a can enter and move along the exterior looping lane 720 (754). While moving along the exterior looping lane 720, for example, the automated pallet mover 130a can continually determine whether it has arrived its destination location (656). If the automated pallet mover 130a arrives at its destination while travelling in the exterior looping lane 720, for example, it may deliver its pallet (758). If the automated pallet mover 130a has not yet arrived at its destination location, but has determined (760) that it also has not yet passed its destination (e.g., according to a line that runs perpendicular to the exterior looping lane 720 at the current location of the automated pallet mover 130a), the automated pallet mover 130a can continue moving along the exterior looping lane 720 (754) until it arrives at its destination.

If, however, the automated pallet mover 130a has not yet arrived at its destination location, and has determined (760) that it has passed its destination (e.g., according to a line that runs perpendicular to the exterior looping lane 720 at the current location of the automated pallet mover 130a), the automated pallet mover 130a can move to an interior loop (762). In the present example, the automated pallet mover 130a can merge from the exterior looping lane 720 into the interior looping lane 710c at a section where the two lanes are overlap with each other.

When moving along an interior looping lane which can provide access to its destination location (754), for example, the automated pallet mover 130a may determine that it has arrived at its destination location (756), and then it may deliver its pallet (758) at the destination location. After delivering its pallet, for example, the automated pallet mover 130a may receive another job from the control system, may proceed to a wait area (not shown), may proceed to a charging station (not shown), or may perform another suitable operation.

Figure 8:
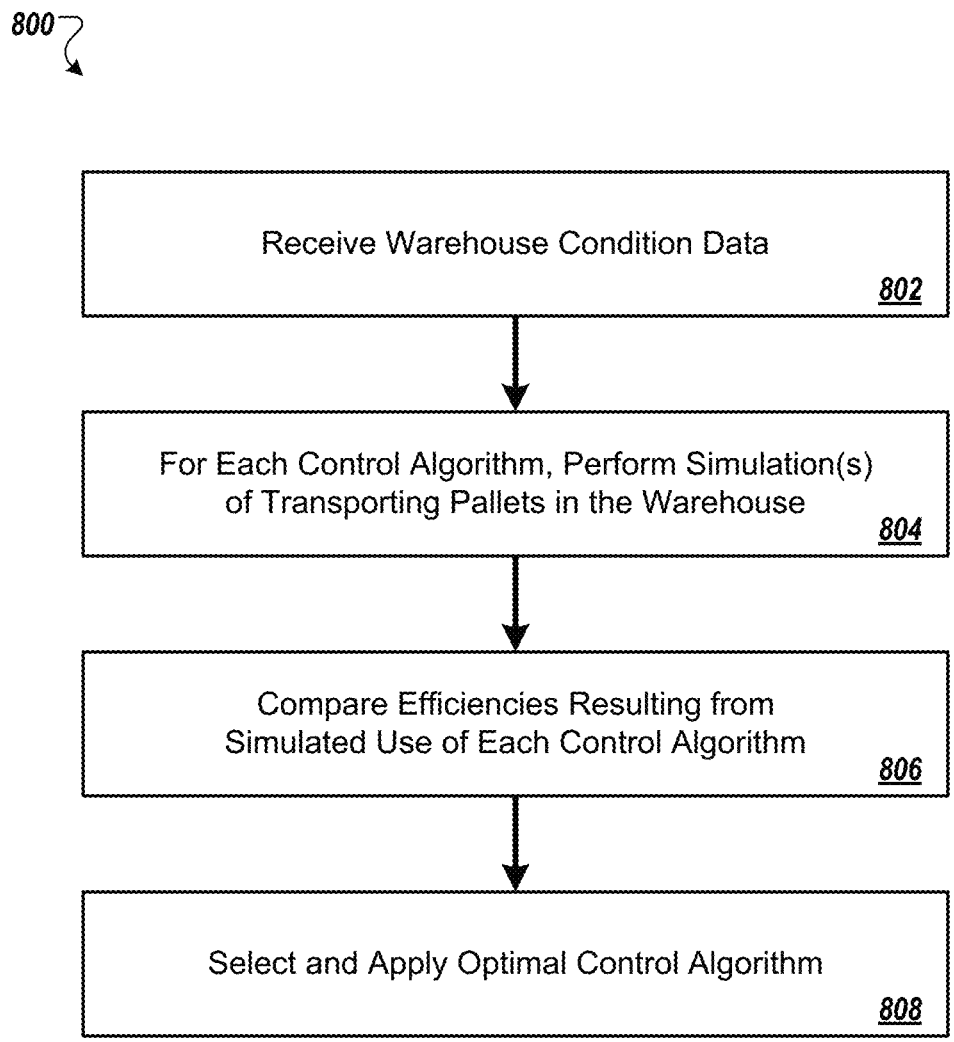
FIG. 8 is a flowchart of an example technique for selecting an optimal control algorithm for operating automated pallet movers in a physical space.

FIG. 8 is a flowchart of an example technique 800 for selecting an optimal control algorithm for operating automated pallet movers in a physical space. For example, one or more of the lane configurations and corresponding control algorithms described with respect to FIGS. 4-7 and/or the technique 300 for determining optimal routes for transporting optimal routes described with respect to FIG. 3 may be optimal for transporting pallets in the warehouse 102, based on current warehouse conditions (e.g., currently available automated pallet movers and current jobs to be performed by the automated pallet movers). The example technique 800 can be performed by any of a variety of appropriate systems, such as the example systems depicted in FIGS. 1A-B.

At 802, warehouse data is received that pertains to current and/or projected conditions in a warehouse. For example, the computing device 140 (shown in FIGS. 1A-B) can receive warehouse condition data, including data that identifies available automated pallet movers 130, data that identifies capabilities of the automated pallet movers 130 (e.g., speed capabilities, sensor capabilities, pallet manipulation capabilities, weight capacities, power levels, etc.), and data that identifies jobs to be performed by the automated pallet movers 130 in the warehouse 102. Data that identifies the jobs to be performed, for example, can include data specifying pallets to be transported in the warehouse 102 (e.g., pallet identifiers, pallet size and weight specifications, goods carried by the pallets, etc.), current and/or anticipated locations of the pallets, and destination locations of the pallets.

At 804, one or more simulations of transporting pallets in the warehouse can be performed, according to each of a plurality of control algorithms. For example, the computing device 140 can perform one or more simulations that process a list of warehouse pallet transportation jobs to be performed (e.g., including pallet identifiers, start locations of the pallets, and destination locations of the pallets), using available automated pallet movers 130, according to the lane configurations and corresponding control algorithms described with respect to each of FIGS. 4A-B, 5A-B, 6A-B, 7A-B, and other potentially suitable configurations/algorithms.

At 806, efficiencies resulting from simulated use of each control algorithm are compared. For example, the computing device 140 can determine, from the performed simulations, and for each control algorithm, an amount of time that it takes to finish the list of warehouse pallet transportation jobs, an amount of power consumed by the automated pallet movers 130 to perform the jobs, a suitable number of automated pallet movers 130 to be assigned the jobs (e.g., to avoid traffic congestion), and other such simulation results.

At 808, an optimal control algorithm is selected and applied. For example, the computing device 140 can select the optimal control algorithm based on pallet throughput (e.g., an amount of time to complete a list of jobs or a portion of the list of jobs), a number of automated pallet movers 130 used for completing a list of pallet transportation jobs, an amount of power expected to be consumed while completing the jobs, another suitable factor, or a weighted combination of factors. After selecting the optimal control algorithm, for example, the computing device 140 can send to each of the automated pallet movers 130 that are designated for working on the pallet transportation jobs, a control algorithm command that causes the automated pallet movers to perform subsequent operations (e.g., pallet transportation) according to a corresponding control algorithm. In some implementations, sending the control algorithm command may include sending instructions for performing the control algorithm and/or location data that defines lanes to be used while performing the control algorithm.

In some implementations, the example technique 800 for selecting an optimal control algorithm for operating automated pallet movers in a physical space can be periodically performed. For example, at a suitable time interval (e.g., once per hour, once every four hours, once per day, or another suitable time interval), further simulations can be performed, efficiencies resulting from simulated performance of the control algorithms can be compared, and possibly a different control algorithm can be selected and applied. As another example, the example technique 800 can be performed in response to a warehouse event, such as one or more pallet transportation jobs being added to a list, one or more trucks arriving at a docking bay, or another sort of event. By periodically simulating use of the various control algorithms, for example, an optimal control algorithm may be applied in response to changing warehouse conditions.

Figure 9:
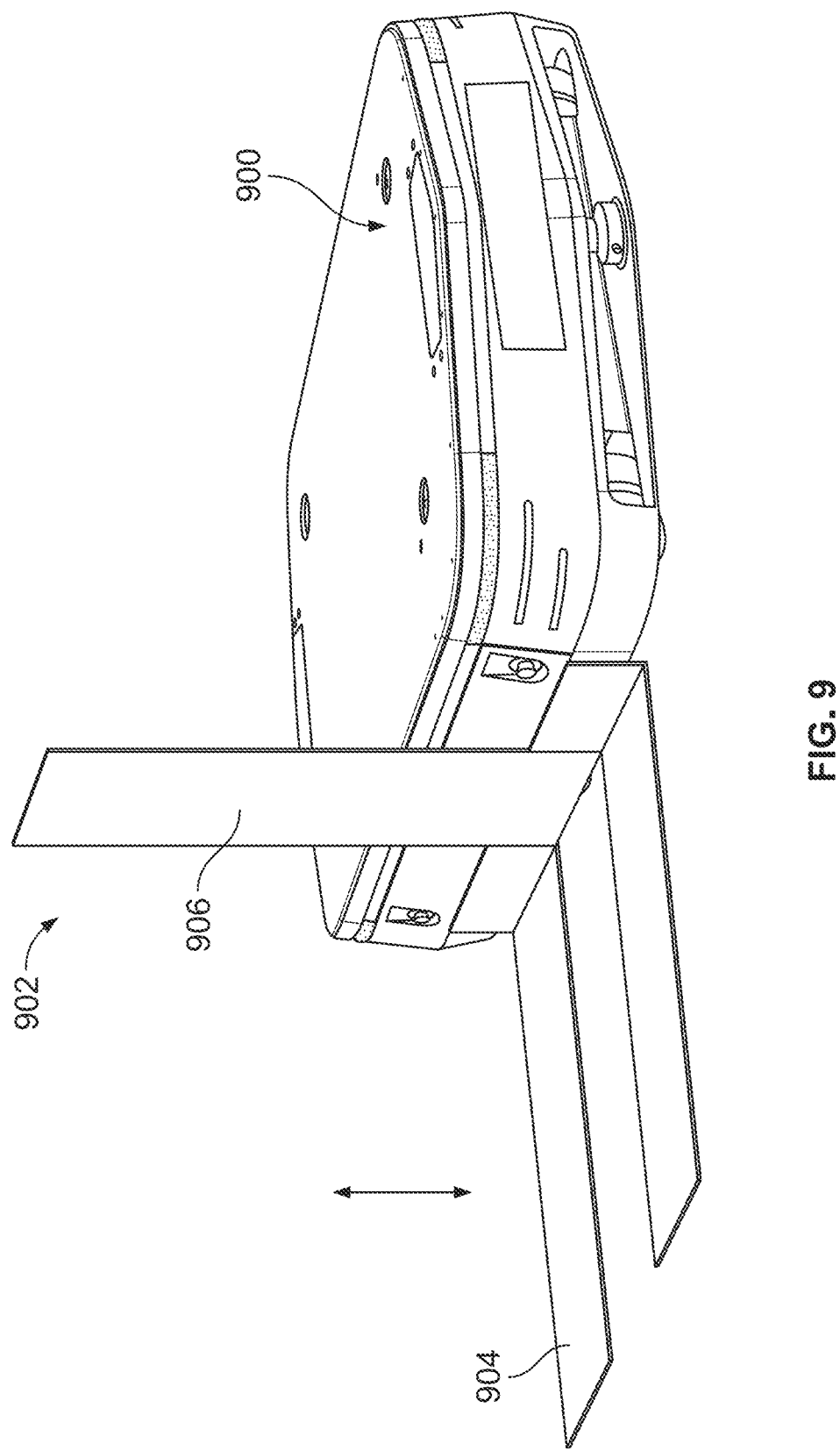
FIG. 9 illustrates another example AGV.

FIG. 9 illustrates another example AGV 900. The AGV 900 can be used for the AGVs described throughout this document, such as those described above with regard to FIGS. 1-8. In this example, the automated vehicle 900 can lift a pallet from the ground for transportation without losing flexibility of the automated vehicle 900 in moving freely in/out and within various areas in a warehouse environment, such as assembly areas, dock areas, case pick areas, etc. The automated vehicle 900 includes a pallet lift structure 902 having forks 904 for supporting an underneath of a pallet, and a fork lift mechanism 906 for vertically moving the forks 904 with respect to the ground.

AGVs that are configured to carry pallets on their top surface, such as the AGVs 200 and 210 described above, may be configured to move faster through a warehouse while carrying a pallet than AGVs with forks, such as the AGV 900. However, the AGVs carrying pallets on their top surface may not be able to lift and lower pallets from a ground surface. For AGVs carrying pallets on their top surface, loading and unloading the pallets on their top surface can involve the pallets already being positioned above the ground at an appropriate level for the AGVs to transition the pallets onto their top surface, such as pallets being positioned on a conveyor belt at an appropriate height, being positioned on a stand at an appropriate height, being held by a forklift/AGV at an appropriate height, and/or other mechanisms for retaining pallets at an appropriate height. As a result, when pallets enter or leave a warehouse via a truck, they may need to be transitioned to an appropriate height for use by the faster moving AGVs 200 and 210 by a forklift-type device, such as the AGV 900 and/or manually operated forklifts. The following description details a variety of configurations for using different types of AGVs in different areas of the warehouse to provide such height transitions for pallets in an efficient manner, such as using the AGVs 900 in different configurations in the staging area 112 and/or the pallet transportation area 120.

Figure 10B:
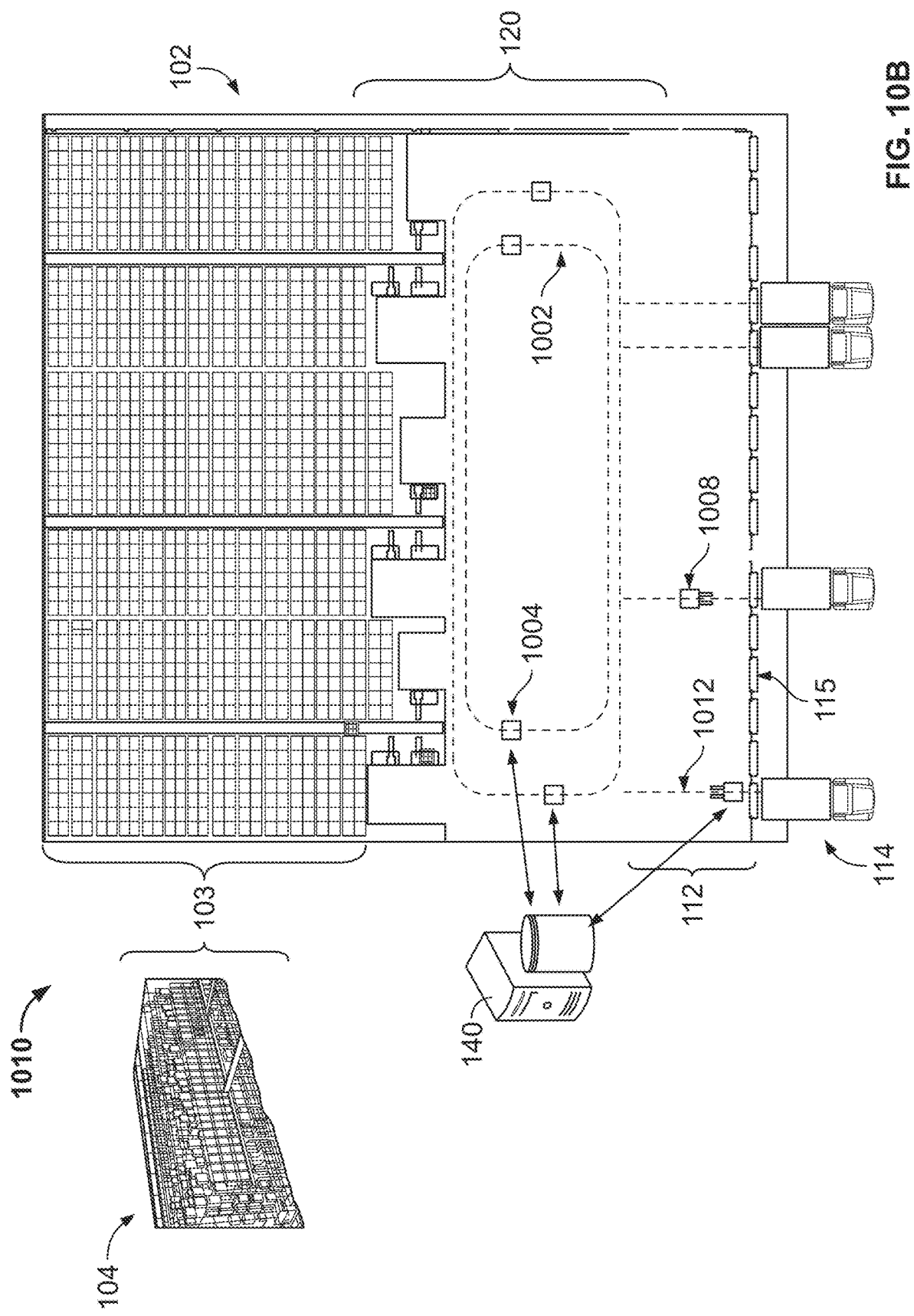
Figure 10C:
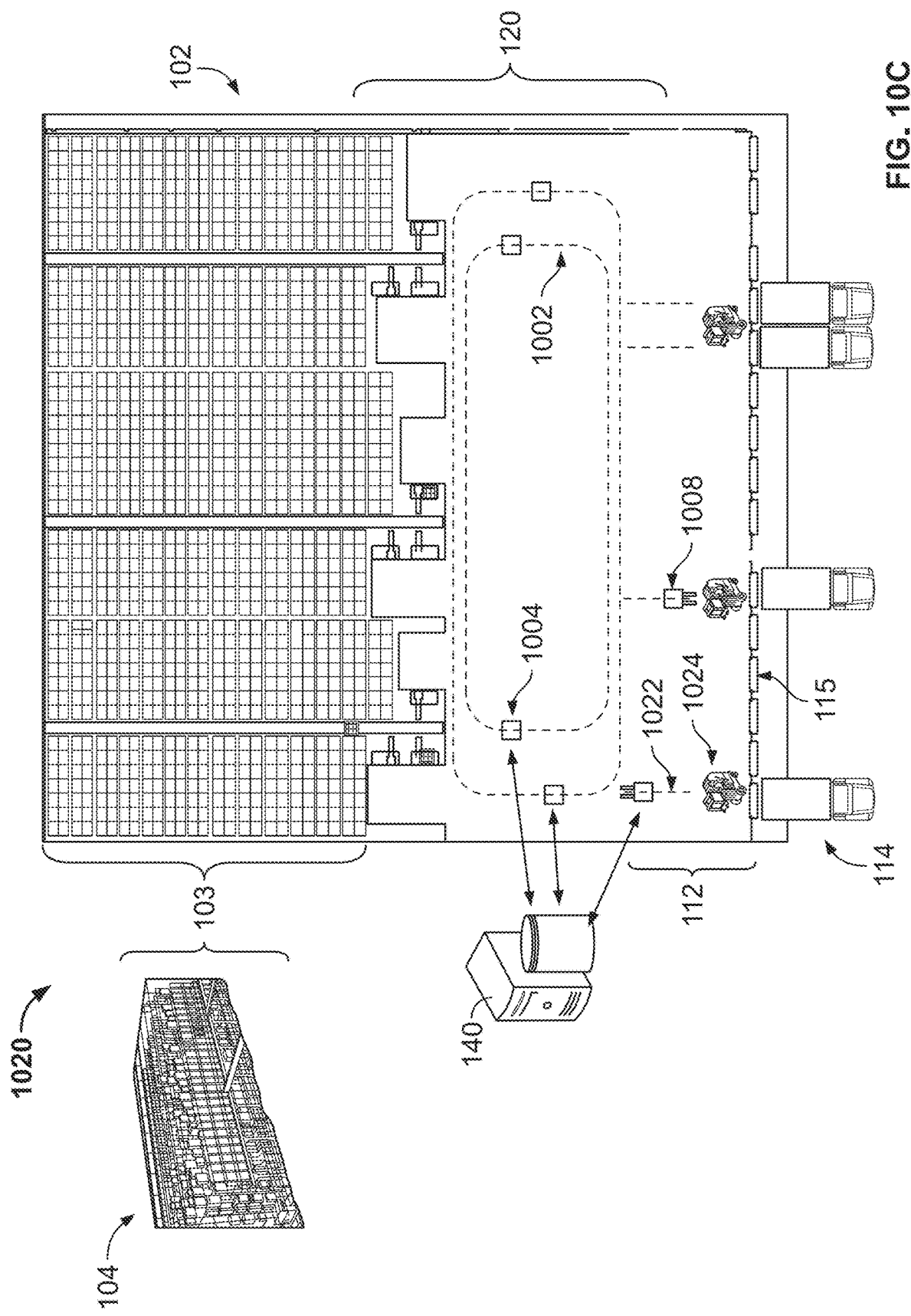

FIGS. 10A-C depict example warehouse environments 1000, 1010, and 1020 in which multiple different types of AGVs are used and controlled in traffic patterns so as to improve the overall efficiency of the warehouse. FIGS. 10A-C reference many of the same components of system 100 described above with regard to FIG. 1A.

Referring to FIG. 10A, a first type of AGV 1004 are controlled by the computer system 140 to operate in a first pattern 1002 to move pallets in the pallet transportation area 120 between the conveyors 116 and the automated storage system 103. The first type of AGVs 1004 can be AGVs that transport pallets on their top surface, such as the AGVs 200 and 210. The first pattern 1002 can be any of the patterns described above with regard to FIGS. 4A, 5A, 6A, and 7A, and/or other patterns. Pallets can be transported in the staging area by a second type of AGV 1008 which can be controlled by the computer system 140 to move according to a second pattern 1006. In this example, the AGVs 1008 can be AGVs capable of lifting and placing pallets on a ground surface, such as the AGV 900. The AGVs 1008 can transport pallets between the trucks 115 and the decks/conveyors 116, and can be controlled to according to the traffic pattern 1006, which is depicted as simple collection of straight lines between the decks/conveyors 116 and the trucks 114. Other traffic patterns can be used for the second type of AGVs 1008, such as the patterns described above with regard to FIGS. 4A, 5A, 6A, and 7A, and/or other patterns. Since the first type of AGV 1004 may operate at a higher rate of speed than the second type of AGV 1008, the first type of AGV 1004 may be tasked with moving pallets laterally across the warehouse to the appropriate deck/conveyor, and the AGVs 1008 may instead restrict their movement to more vertical movement, minimizing their drive time and the complexity of their traffic pattern. Such a configuration of the relative patterns and movements of the AGVs 1004 and 1008 can minimize the lateral travel time for pallets throughout the warehouse, and can maximize the pallet throughput. AGVs 1008 may be reassigned to different vertical traffic paths, which may be changed, created, and deprecated depending on the trucks 114 that are currently parked in the bays 115 for loading and unloading.

Referring to FIG. 10B, in this example environment 1010 the decks/conveyors from environment 1000 (FIG. 10A) have been removed and instead replaced by the second type of AGV 1008, which move pallets between the trucks 114 and the first type of AGVs 1004 according to the traffic patterns 1012. The second type of AGV 1008 can load and unload pallets from the first type of AGV 1004, and/or can place them on stands from which the first type of AGVs 1004 can load and unload pallets. This configuration in environment 1010 can provide additional flexibility and configurability by removing physical conveyors, which are replaced by the second type of AGVs 1008 and their readily configurable traffic patterns 1012.

Referring to FIG. 10C, in this example environment 1020 the conveyors are again removed, but human-operated forklifts 1024 are added to move pallets in and/or out of the trucks 114, with the second type of AGVs 1008 moving pallets according to the patterns 1022 between the forklifts 1024 and the first type of AGVs 1004. There are some tasks that AGVs may have difficulty accomplishing, such as unloading trucks when pallets are tipped/slanted. In such instances, human forklift operators 1024 may be used to perform these tasks. Loading trucks with well-aligned and stored pallets may not have the same types of problems, and may be more consistently able to be performed by the second type of AGVs 1008 without human-operated forklifts 1024. In such an environment 1020, the second type of AGVs 1008 may by default perform the truck loading and unloading, and may signal for human intervention by the human-operated forklifts 1024 when instances are encountered in which the AGVs 1008 are not able to safely perform the task.

Other warehouse environment configurations using first and second types of AGVs are also possible.

Figure 11:
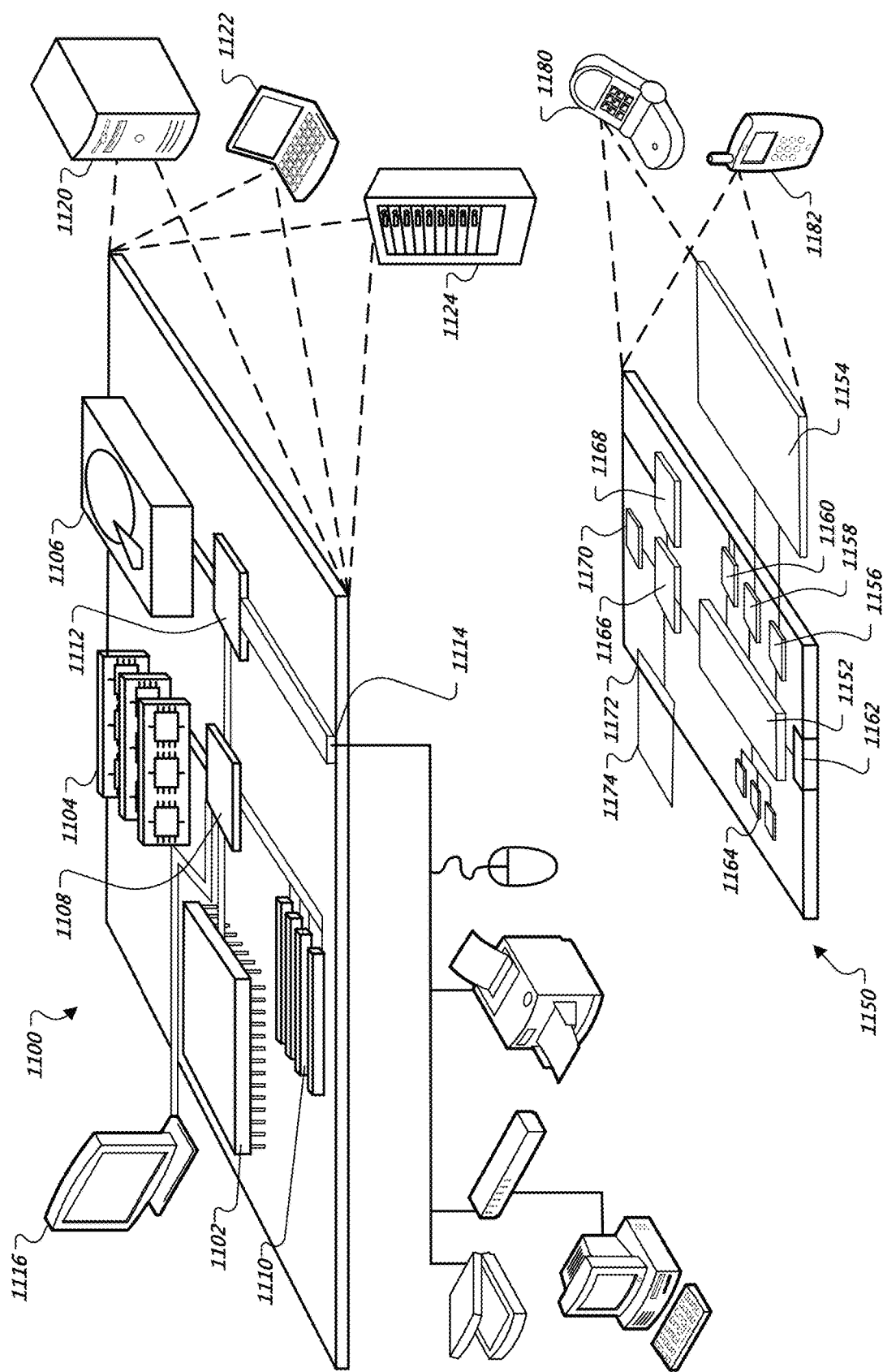
FIG. 11 is a block diagram of example computing devices that may be used to implement the devices, systems, and methods described in this document.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high-speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may be provided, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. An automated pallet mover configured to concurrently operate in a physical space with other automated pallet movers, the automated pallet mover comprising:
   a pallet support mechanism configured to support a pallet while the automated pallet mover transports the pallet in the physical space;
   at least one sensor configured to detect physical objects in the physical space;
   a communication interface configured to wirelessly communicate with a control system that is remote from the automated pallet mover; and
   an onboard computer that is configured to control operations of the automated pallet mover in real time, based on pallet transportation commands from the control system, based on sensor data from the at least one sensor, and according to a performance of a control algorithm, the operations comprising:
      receiving a pallet transportation command, from the control system and through the communication interface, wherein the pallet transportation command specifies (i) a retrieval location that indicates a pallet handling location from which the pallet is to be retrieved, and (ii) a destination location that indicates a pallet handling location to which the pallet is to be delivered;
      moving to the retrieval location and retrieving the pallet from the retrieval location;
      after retrieving the pallet, transporting the pallet along a slow lane that is specified by the control algorithm;
      while transporting the pallet, (i) receiving sensor data from the at least one sensor that indicates a current location and movement of another automated pallet mover, (ii) determining whether transitioning into a fast lane that is specified by the control algorithm would impede the other automated pallet mover, and (iii) in response to determining that transitioning into the fast lane would not impede the other automated pallet mover, transitioning into the fast lane and transporting the pallet along the fast lane; and
      delivering the pallet to the destination location.

2. The automated pallet mover of claim 1, wherein the pallet support mechanism is a top surface of the automated pallet mover.

3. The automated pallet mover of claim 1, wherein the pallet support mechanism is a forklift mechanism that is configured to lift the pallet from the ground and lower the pallet to the ground.

4. The automated pallet mover of claim 1, wherein the at least one sensor comprises a stereoscopic camera.

5. The automated pallet mover of claim 4, wherein the slow lane and the fast lane are each virtual lanes that are logically identified by the automated pallet mover using the stereoscopic camera and a digital map.

6. The automated pallet mover of claim 4, wherein the slow lane and the fast lane are each marked lanes that are physically detected by the automated pallet mover using the stereoscopic camera.

7. The automated pallet mover of claim 1, wherein the at least one sensor comprises a magnetic sensor, and wherein the slow lane and the fast lane are each physically detected by the automated pallet mover using the magnetic sensor.

8. The automated pallet mover of claim 1, wherein the slow lane is adjacent to each of the pallet handling locations and forms a loop, and wherein the fast lane forms a loop inside of the slow lane.

9. The automated pallet mover of claim 8, wherein movement along the slow lane and the fast lane occurs in a same direction by the automated pallet mover and the other automated pallet mover.

10. The automated pallet mover of claim 1, wherein at least one pallet handling location is at the end of a conveyor belt in the physical space.

11. The automated pallet mover of claim 1, wherein at least one pallet handling location is a designated area on a floor of the physical space.

12. The automated pallet mover of claim 1, the operations further comprising:
   receiving, from the control system and through the communication interface, a specification of the control algorithm.

13. The automated pallet mover of claim 1, wherein the control algorithm defines a common set of rules to be followed by the automated pallet mover and the other automated pallet mover when navigating through the physical space according to the slow lane and the fast lane.

14. The automated pallet mover of claim 13, wherein the common set of rules includes one or more of a minimum speed, a maximum speed, a rate of acceleration, a rate of deceleration, and a right of way.

15. The automated pallet mover of claim 1, wherein the retrieval location is a staging area, and wherein retrieving the pallet from the retrieval location comprises searching for and locating the pallet in the staging area.

16. The automated pallet mover of claim 1, wherein the retrieval location is an interior of a vehicle, and wherein retrieving the pallet from the retrieval location comprises searching for and locating the pallet in the vehicle.

17. The automated pallet mover of claim 1, the operations further comprising:
- while moving along the fast lane, (i) determining whether the destination location is within a threshold distance of the automated pallet mover, (ii) in response to determining that the destination location is within the threshold distance, transitioning into the looping slow lane, and (iii) transporting the pallet along the looping slow lane until the destination location is reached.

18. The automated pallet mover of claim 1, the operations further comprising:
- after delivering the pallet to the destination location, receiving, from the control system and through the communication interface, a subsequent pallet transportation command.

19. The automated pallet mover of claim 1, the operations further comprising:
- after delivering the pallet to the destination location, moving to a wait area or a charging station.

* * * * *